United States Patent [19]
Kunimasa

[11] Patent Number: 6,072,114
[45] Date of Patent: Jun. 6, 2000

[54] SCORE DISPLAY APPARATUS AND METHOD CAPABLE OF DISPLAYING ADDITIONAL DATA, AND STORAGE MEDIUM

[75] Inventor: Muroi Kunimasa, Hamamatsu, Japan

[73] Assignee: Yamaha Corporation, Hamamatsu, Japan

[21] Appl. No.: 09/222,478

[22] Filed: Dec. 29, 1998

[30] Foreign Application Priority Data

Jan. 13, 1998 [JP] Japan .................................. 10-016416

[51] Int. Cl.⁷ .............................. G09B 5/02; G09B 15/02
[52] U.S. Cl. ..................................... 84/477 R; 434/307 A
[58] Field of Search .................. 84/477 R, 478; 434/307 A

[56] References Cited

U.S. PATENT DOCUMENTS

| | | | |
|---|---|---|---|
| 3,926,088 | 12/1975 | Davis et al. | 84/477 R X |
| 4,976,182 | 12/1990 | Obuchi . | |
| 5,549,029 | 8/1996 | Lepinski | 84/478 X |
| 5,563,358 | 10/1996 | Zimmerman | 84/477 R |
| 5,728,960 | 3/1998 | Sitrick | 84/477 R |
| 5,746,605 | 5/1998 | Kennedy . | |
| 5,931,680 | 8/1999 | Semba | 434/307 A |

FOREIGN PATENT DOCUMENTS 8-123416   5/1996   Japan .

*Primary Examiner*—Stanley J. Witkowski

[57] ABSTRACT

A score display apparatus is provided, which permits a wider range of applications without degrading handling ease. An input device inputs score display data, an adding device adds additional data to the score display data input by the input device, and a storage device stores the score display data and the additional data. A display device displays a score based on the score display data input by the input device, and also displays the additional data such that the additional data is associated with the score based on the score display data. A storing device stores the score display data and the additional data in the storage device while associating the score display data and the additional data with each other.

15 Claims, 21 Drawing Sheets

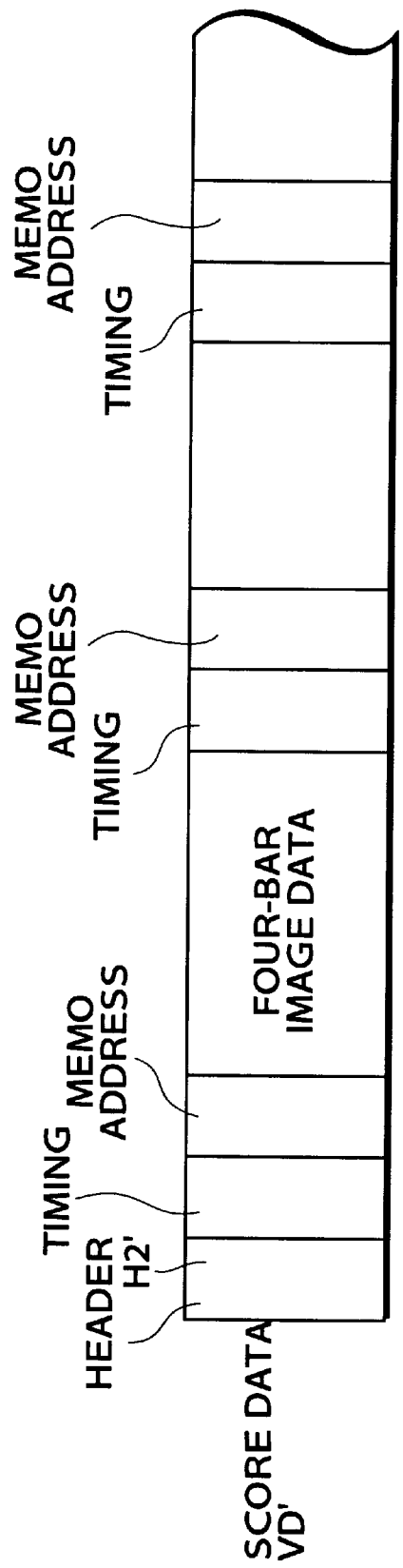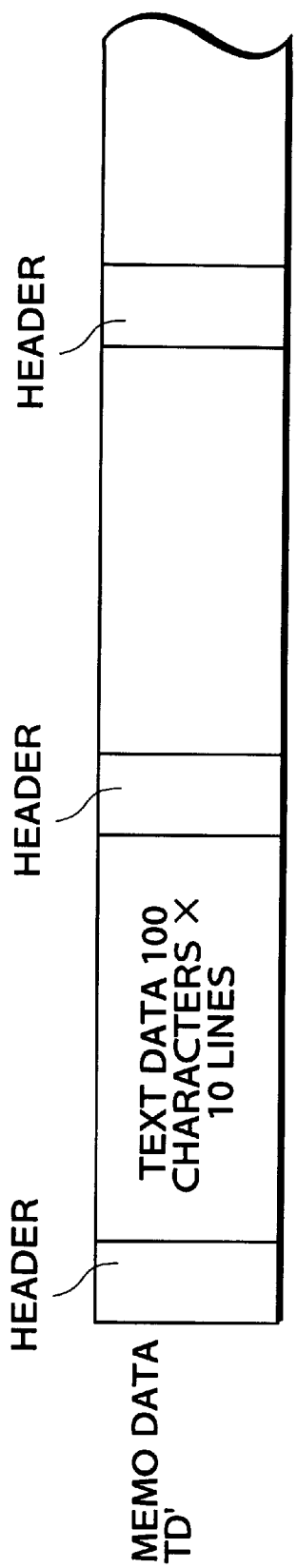

SCORE DISPLAY APPARATUS AND METHOD CAPABLE OF DISPLAYING ADDITIONAL DATA, AND STORAGE MEDIUM

BACKGROUND OF THE INVENTION

1. Field of the Invention

The present invention relates to score display apparatus and method, and a storage medium, which enables score display data to be input from a storage medium, or the like, and displays a score on a display device.

2. Prior Art

A score display apparatus is known which inputs score display data in the form of electronic data, from a storage medium or communication means, and displays a score represented by the score display data, on a display device, as disclosed in Japanese Laid-Open Patent Publication (Kokai) No. 8-123416.

The known apparatus inputs score display data as image data, and relevant display control data, as well as automatic performance data, such as MIDI (Musical Instrument Digital Interface) data, from a floppy disc, so that the apparatus can automatically play a piece of music, and a score can be automatically displayed in accordance with the automatic performance of the music. A player is able to change the tempo of the automatic performance or enters a command to start or stop the automatic performance. The player is also able to play the piece of music by himself/herself on a keyboard device, while scrolling the score with a manual switch. Thus, the known apparatus can be easily used with an improved efficiency, as compared with the case where a score printed on paper is used.

To learn or practice playing the musical instrument, however, the player may wish to put notes to be referred to during a performance, or instructions of a teacher, on each part of the score to be played, and leave these notes or instructions as memos. Although such memos can be easily written on a score printed on paper, using a pen, it is impossible to write memos on the score consisting of electronic data provided by the known score display device. Thus, the known display apparatus still has room for improvements in terms of freedom in its usage.

SUMMARY OF THE INVENTION

It is the object of the invention to provide score display apparatus and method, and a storage medium, which permits a wider range of applications without degrading handling ease.

To attain the above object, the present invention provides a score display apparatus comprising an input device that inputs score display data, an adding device that adds additional data to the score display data input by the input device, a storage device that stores the score display data and the additional data, a display device that displays a score based on the score display data input by the input device, and also displays the additional data such that the additional data is associated with the score based on the score display data, and a storing device that stores the score display data and the additional data in the storage device while associating the score display data and the additional data with each other.

Preferably, the input device inputs the score display data and the additional data that are stored in the storage device by the storing device, and the adding device includes an updating device capable of updating the additional data added to the score display data.

Also preferably, the additional data comprises at least one of text data, image data, voice data, and performance data.

In a preferred embodiment of the invention, the score display apparatus further comprises a character recognition device that recognizes a character written by a user, and produces text data corresponding to the recognized character, wherein the additional data comprises the text data produced by the character recognition device.

More preferably, the character recognition device presents at least one candidate of the recognized character to the user, and produces text data corresponding to one of the at least one candidate that is selected by the user.

To attain the object, the present invention also provides a method of displaying a score, comprising the steps of inputting score display data, adding additional data to the input score display data, displaying the input score display data on a display device, and also displaying the additional data such that the additional data is associated with the score display data displayed on the display device, and storing the score display data and the additional data in a storage device while associating the score display data and the additional data with each other.

To attain the object, the present invention further provides a mechanically readable storage medium storing commands that cause a machine to perform a score displaying method comprising the steps of inputting score display data, adding additional data to the input score display data, displaying the input score display data on a display device, and also displaying the additional data such that the additional data is associated with the score display data displayed on the display device, and storing the score display data and the additional data in a storage device while associating the score display data and the additional data with each other.

According to the invention, as constructed as above, the additional data such as memos, e.g. points to be noted during a performance, guidance or instructions of a teacher, or notes, can be displayed in association with the score. Furthermore, the additional data added to the score display data can be stored in the storage device, and can be read out and used again, which is particularly advantageous when the piece of music is played a plurality of times for practice. Also, the additional data can be entered as if memos were written on paper, thus assuring improved handling ease.

The above and other objects, features, and advantages of the invention will become more apparent from the following detailed description taken in conjunction with the accompanying drawings.

BRIEF DESCRIPTION OF THE DRAWINGS

FIGS. 5A–5C are views showing one example of the structure of data stored in a song data storage portion of the floppy disc, wherein:

FIG. 5A shows the structure of musical tone data;

FIG. 5B shows the structure of score data; and

FIG. 5C shows the structure of memo data;

FIGS. 20A and 20B are views showing another example of the structure of data stored in the floppy disc of FIG. 1, wherein:

FIG. 20A shows the structure of score data; and

FIG. 20B shows the structure of memo data; and

DETAILED DESCRIPTION OF THE PREFERRED EMBODIMENT

The invention will be described with reference to the accompanying drawings showing a preferred embodiment thereof.

Figure 1:
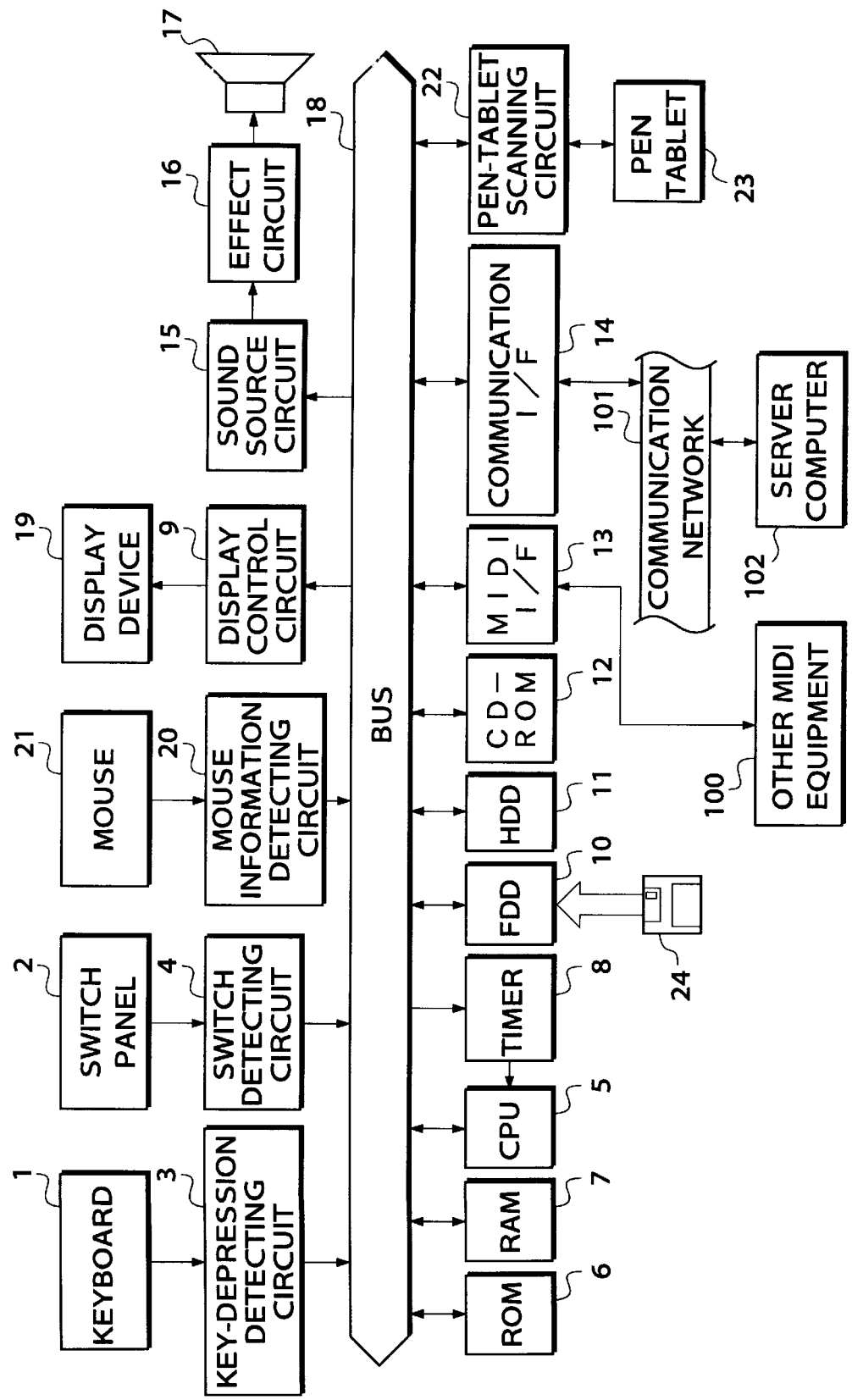
FIG. 1 is a block diagram showing the construction of an electronic instrument incorporating a score display apparatus according to one embodiment of the present invention.

FIG. 1 is a block diagram showing the construction of an electronic musical instrument that incorporates a score display apparatus according to one embodiment of the present invention.

The electronic musical instrument of the present embodiment includes a key-depression detecting circuit 3, switch detecting circuit 4, ROM 6, RAM 7, timer 8, display control circuit 9, floppy disc drive (FDD) 10, hard disc drive (HDD) 11, and a CD-ROM (compact-disc read only memory) drive 12. The electronic instrument further includes a MIDI interface (MIDI I/F) 13, communication interface (communication I/F) 14, tone generator circuit 15, sound effect circuit 16, mouse information detecting circuit 20, and a pen-tablet scanning circuit 22. These circuits, memories, drives and others are connected to a CPU 5 via a bus 18.

In addition, a keyboard 1 is connected to the key-depression detecting circuit 3, and a switch panel or switch board 2 is connected to the switch detecting circuit 4. A mouse 21 that has a switch or switches is connected to the mouse information detecting circuit 20, and a display device 19 formed e.g. of LCD or CRT is connected to the display control circuit 9. The timer 8 is connected to the CPU 5, and other MIDI equipment 100 is connected to the MIDI I/F 13. A server computer 102 is connected to the communication I/F 14 through a communication network 101, and the effect circuit 16 and a sound system 17 are connected in series with the tone generator circuit 15. A pen tablet 23 is connected to the pen-tablet scanning circuit 22.

The key-depression detecting circuit 3 serves to detect the depressed state of each key (not shown) of the keyboard 1. The switch panel 2 is provided with a plurality of switches for entering various kinds of information. The switch detecting circuit 4 serves to detect the operated or pressed state of each switch on the switch panel 2. The CPU 5 governs control of the whole apparatus. The ROM 6 stores control programs to be executed by the CPU 5, table data, and others. The RAM 7 temporarily stores various input information, such as automatic performance data, image data for display of scores, and text data, and operation results. The timer 8 serves to count interrupt time during timer interrupt processing, and various other periods of time or durations. The display control circuit 9 causes the display device 19 to display various information, such as a score.

The floppy disc drive 10 is adapted to drive a floppy disc 24 as one example of storage medium, which stores the control programs as indicated above, various application programs, and various data. The hard disc drive 11 serves as an external storage device and stores various application problems including the above control programs, and various data. The CD-ROM drive 12 is adapted to drive a CD-ROM, not shown, that stores various application programs including the above control programs, and various data.

The MIDI I/F 13 receives MIDI signals from an external device, such as other MIDI equipment 100, and outputs MIDI signals to such an external device. The communication I/F 14 transmits and receives data to and from the server computer 102, or the like, through the communication network 101. The tone generator circuit 15 converts automatic performance data in the form of song data received from the floppy disc drive 10, CD-ROM drive 12 or MIDI I/F 13, into musical tone signals. The effect circuit 16 serves to give various sound effects to the musical tone signals received from the tone generator circuit 15, and transmit the resulting musical tone signals to the sound system 17, such as a speaker, which in turn converts the musical tone signals into actual sound.

The mouse information detecting circuit 20 detects movement of the mouse 21, and the operated state or ON/OFF position of the switch(es) provided on the mouse 21. The pen-tablet scanning circuit 22 reads line drawing entered by means of the pen tablet 23 as described later, and transfers it to the RAM 7.

The hard disc drive 11 is able to store control programs to be executed by the CPU 5 as described above. Where a certain control program is not stored in the ROM 6, the control program may be stored in a hard disc mounted in the hard disc drive 11, and then read into the RAM 7 so that the CPU 5 can perform substantially the same operation as in the case where the control program is stored in the ROM 6. This arrangement facilitates addition of control programs and upgrading of the version of the programs.

Control programs and various data that are read out from a CD-ROM in the CD-ROM drive 12 are stored in the hard disc within the HDD 11. This makes it easy to install new control programs and upgrade the version of programs, for example. Other than the CD-ROM drive 12, various types of devices, such as a magneto-optical disc (MO) drive, that utilize various forms of media may be provided as external storage devices.

As described above, the communication I/F 14 is connected to the communication network 101, such as LAN (local area network), Internet, and telephone lines, thereby to be connected to the server computer 102 via the communication network 101. In the case where a desired program or a desired set of parameters is not stored in the hard disc drive 11, the communication I/F 14 may be used for downloading the program or parameters from the server computer 102. A client computer (i.e., electronic musical instrument incorporating the score display apparatus according to the present embodiment) transmits a command to the server computer 102, through the communication I/F 14 and communication network 101, to request downloading of the desired program or parameters. Upon receipt of the command, the server computer 102 delivers the requested program or set of parameters to the client computer, through the communication network 101. The client computer then receives the program or set of parameters, through the communication I/F 101, and stores the same in the hard disc within the hard disc drive 11. In this manner, downloading is completed.

It is also possible to provide another interface for directly transmitting and receiving data to and from an external computer, or the like.

Figure 2:
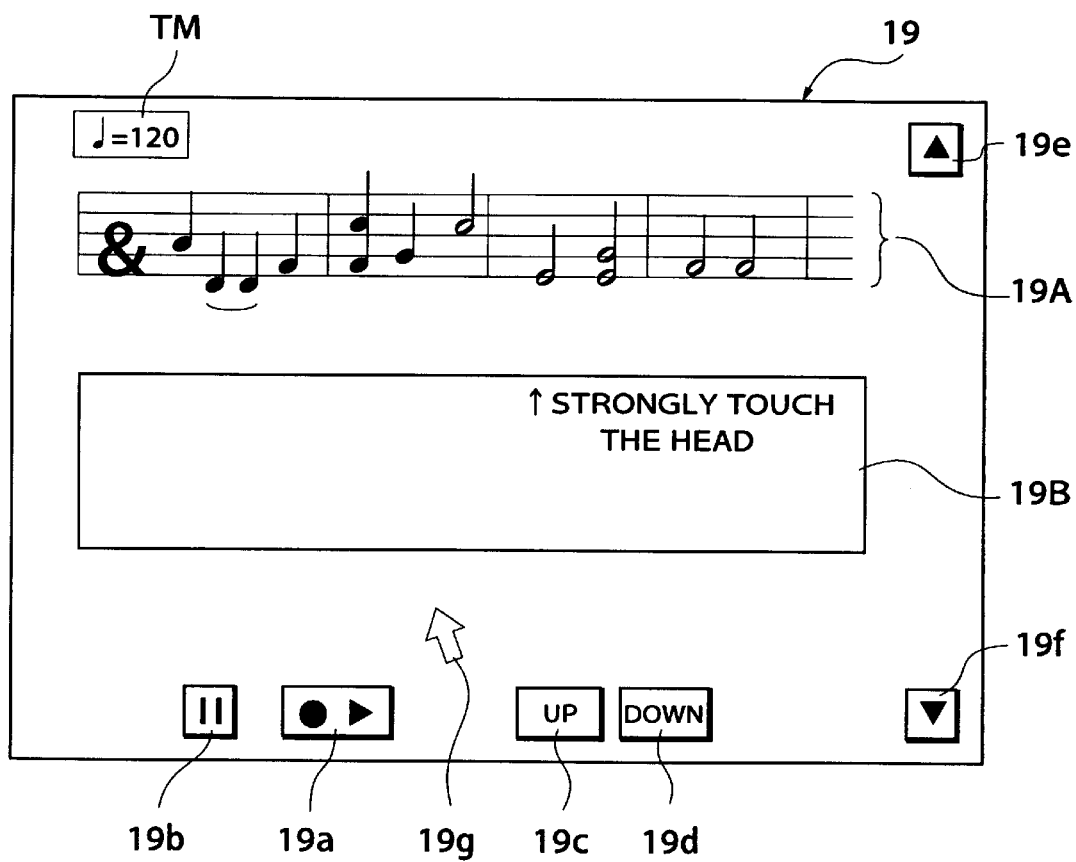
FIG. 2 is a view showing one example of display contents on a display device appearing in FIG. 1.

FIG. 2 shows one example of display contents that appear on the display device 19 having a display region 19A and a display region 19B. The display region 19A is a score display region in which a tempo value TM and a part of a score corresponding to four bars or measures can be displayed. The display region 19B is a character information display region in which up to 1000 characters can be displayed. Detailed arrangements for displaying these information will be described later. In the present embodiment, some notes to be referred to during a performance can be entered as memos, and displayed as additional information (additional data) relating to a certain range (four bars) of the score that is being displayed and automatically played. Further, the present apparatus is constructed so that the contents of the memos can be stored and updated.

In addition to the display regions 19A, 19B, various menu buttons are also displayed on the display device 19. The user is able to select any one of these menu buttons by using the mouse 21 to move a pointer 19G over the display screen, and pressing a mouse button when the pointer 19G is located on the selected menu button. The menu buttons include a playback/stop (start/stop) button 19a for starting or stopping an automatic performance, a pause button 19b for temporarily stop or restart the automatic performance, a tempo-up button 19c to speed up the tempo of the performance, a tempo-down button 19d to speed down the tempo of the performance, a previous-page button 19e for displaying and playing the previous page (previous four bars) of the score, and a next-page button 19f for displaying and playing the next page (next four bars).

Figure 3:
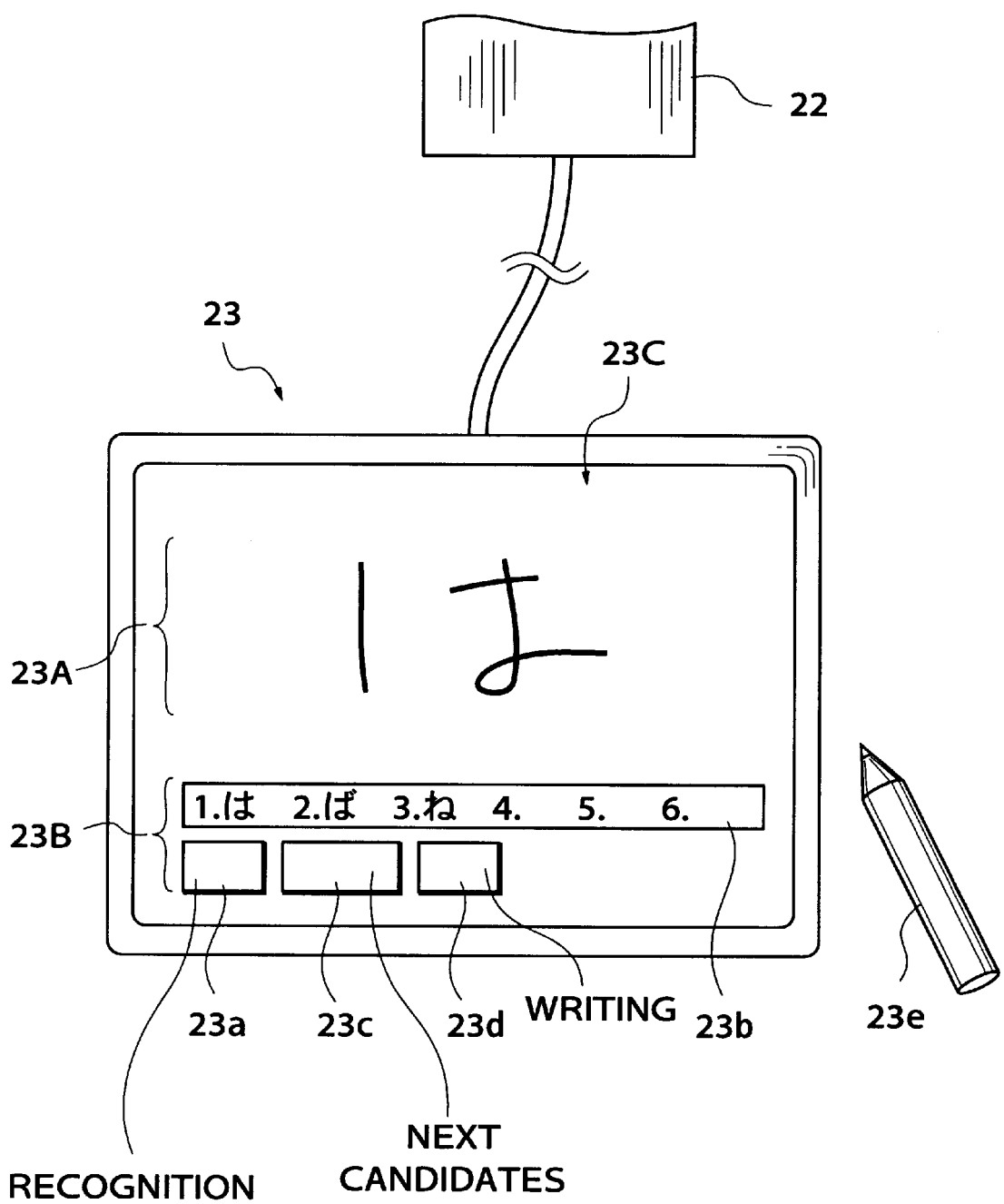
FIG. 3 is a view showing the construction of a pen tablet appearing in FIG. 1.

FIG. 3 shows the appearance of the pen tablet 23. The pen tablet 23 includes a display portion 23C capable of displaying information, and the display portion 23C also functions as a character input region 23A and a tablet input region 23B that allow input of information into the screen with a suitable pen 23e. The character input region 23A allows the user to enter or input characters or other images, so that the characters are displayed in the display region 19B of the display device 19. If the user moves the pen 23e over the surface of the character input region 23A, a track of the movement is displayed in the input region 23A. In FIG. 3, for example, a track or image that looks like a Japanese character "は" is displayed. The tablet input region 23B allows the user to enter or input instructions with menu buttons, and includes a recognition button 23a for generating a command to perform a process for recognizing a character drawn in the character input region 23A, a character candidate display region 23b in which a set of candidates as a result of recognition of the character is displayed, for enabling the user to select an appropriate one of the candidates, a next-candidate display button 23c for generating a command to display the next set of candidates, if any, and a writing button 23d for generating a command to write the selected character into the RAM 7.

Figure 4:
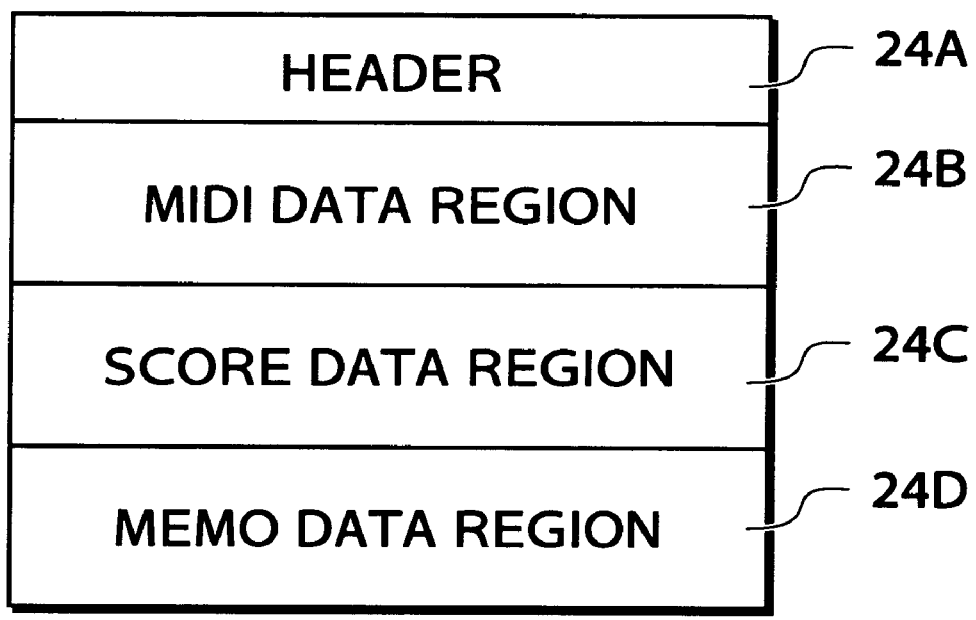
FIG. 4 is a view showing a data format of a song data storage portion of a floppy disc (FD) appearing in FIG. 1.

FIG. 4 shows a data format of a song data storage portion of the floppy disc 24. The song data storage portion of the floppy disc 24 consists of a head region 24A, MIDI data region 24B, score data region 24C, and a memo data region 24D.

Figure 5A:
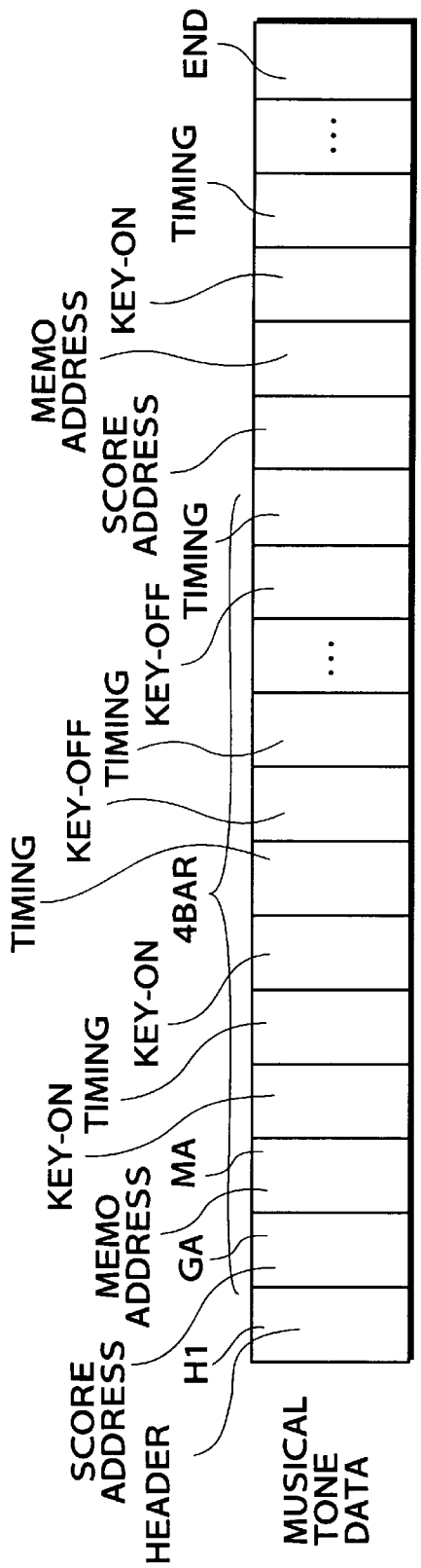
Figure 5B:
Figure 5C:

FIGS. 5A–5C show one example of the structure of data stored in the song data storage portion of the floppy disc 24. Musical tone data MD (automatic performance data) as shown in FIG. 5A are stored in the header region 24A and MIDI data region 24B shown in FIG. 4, and score data VD (for display of a score) as shown in FIG. 5B are stored in the score data region 24C shown in FIG. 4. Memo data TD (additional data) as shown in FIG. 5C are stored in the memo data region 24D shown in FIG. 4.

The musical tone data MD shown in FIG. 5A correspond to a piece of music to be automatically played, and consist of, for example, MIDI codes. More specifically, the tone data MD consist of header data H1, score address data GA, memo address data MA, key-on (event) data, timing data, key-off (event) data, and end data.

The header data H1 include time pattern data that represents a musical time pattern, tempo data that represents the initial tempo value, and other data. The key-on data serves to send a command to the tone generator circuit 15 to generate a musical tone, and the key-off data serves to send a command to the tone generator circuit 15 to attenuate or cancel the musical tone that has been generated. The timing data specifies the timing of generation of subsequent key-on data or key-off data. The end data indicates the end of the piece of music.

The score address data GA is designation data that specifies which set of image data for four bars in the score data VD shown in FIG. 5B corresponds to the tone data MD for four bars that follow the score address data GA. The memo address data MA is designation data that specifies which set of text data for four bars in the memo data TD shown in FIG. 5C corresponds to the tone data MD for four bars that follow the memo address data MA.

The score data VD shown in FIG. 5B serve to display a score of a piece of music while it is being automatically played, such that the display and the automatic performance proceed in synchronism with each other. The score data VD consist of header data H2, and image data constructed for each set of four bars of the score. The header data H2 is designation data that specifies which set of data for four bars in the tone data MD shown in FIG. 5A corresponds to the image data that follows the header data H2 in question. With the score address data GA and the header data H2 matching each other, the relationship between the tone data MD for each set of four bars and the score data VD for the same set of four bars is established.

The memo data TD shown in FIG. 5C are additional data for displaying characters in accordance with display of the score, and consist of header data H3 and text data for each set of four bars. The header data H3 is designation data that specifies which set of image data for four bars in the score data VD shown in FIG. 5B corresponds to the text data that follows the header data H3. With the memo address data MA and the header data H3 matching each other, the relationship between the tone data MD for each set of four bars and the memo data VD for the same set of four bars is established, and the relationship between the score data VD and the memo data TD is also established.

Although the tone data MD and the score data VD are stored in advance in the floppy disc 24, the memo data TD are not stored in the floppy disc in its initial condition. The memo data TD are stored in the floppy disc 24 only after the automatic performance is conducted at least one time. It is, however, to be understood that memo data TD containing some notes or instructions, for example, may be stored in advance in the floppy disc 24.

Figure 6:
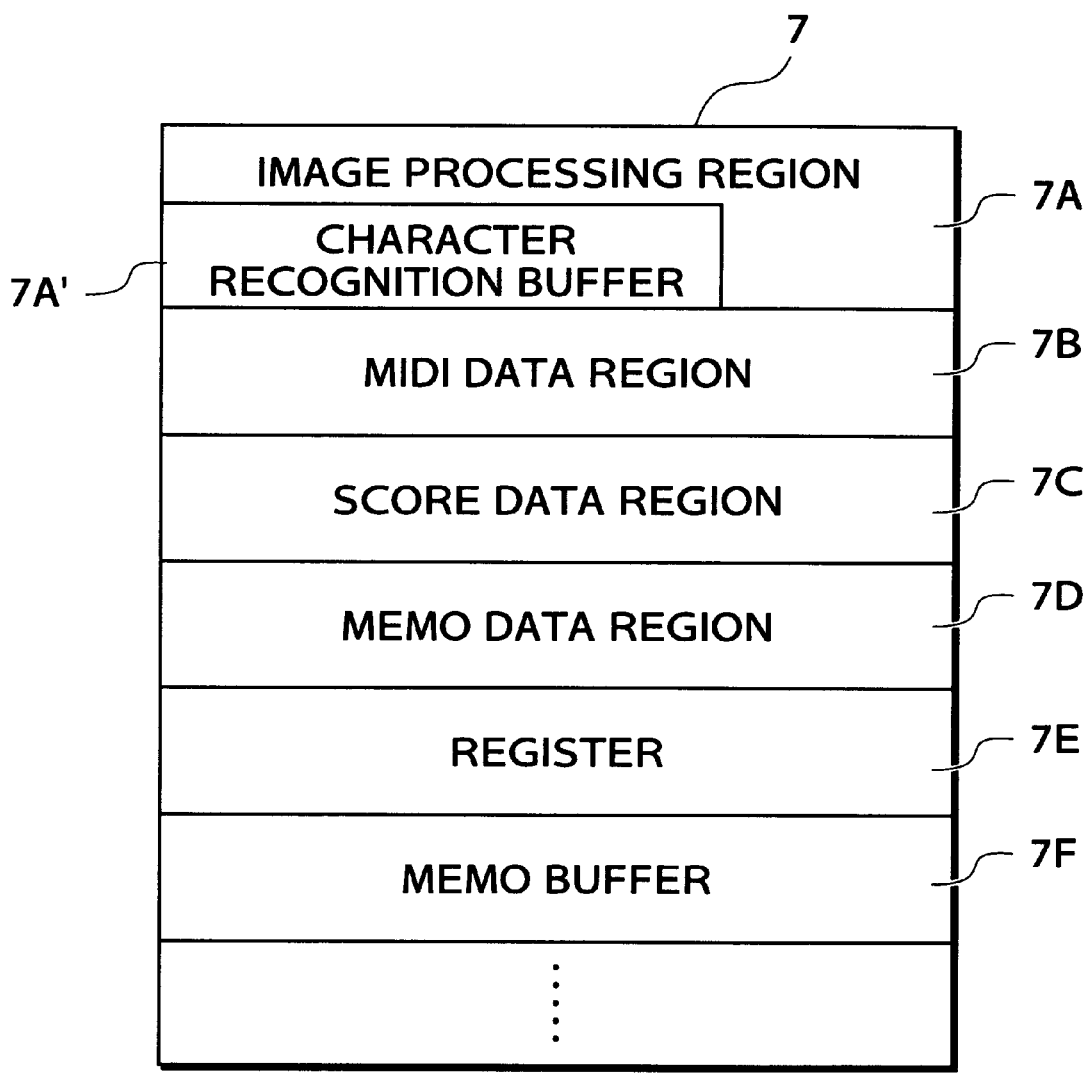
FIG. 6 is a view showing the structure of a storage region of RAM appearing in FIG. 1.

FIG. 6 shows the arrangement of a storage region of the RAM 7. As shown in FIG. 6, the storage region of the RAM 7 consists of an image processing region 7A, MIDI data region 7B, score data region 7D, memo data region 7D, register 7E, memo buffer 7F, and others. The image processing region 7A contains a buffer 7A' for recognizing characters.

The image processing region 7A is used as a work area for processing image data, and the buffer 7A' for recognizing characters is used for temporarily storing handwritten information that has been entered through the pen tablet 23. The MIDI data region 7B corresponds to the header region 24A and MIDI data region 24B of the floppy disc 24 shown in FIG. 4, and the score data region 7C and the memo data region 7D respectively correspond to the score data region 24C and the memo data region 24D shown in FIG. 4. The data regions 7B, 7C, 7D store the tone data MD, score data VD, and the memo data TD, respectively, which are read from the floppy disc 24.

The register 7E stores various flags, count values, addresses, and so forth, as described later. The memo buffer 7F stores characters that have been entered and selected with the pen tablet 23.

The operation of the electronic musical instrument constructed as described above will be now described.

Figure 7:
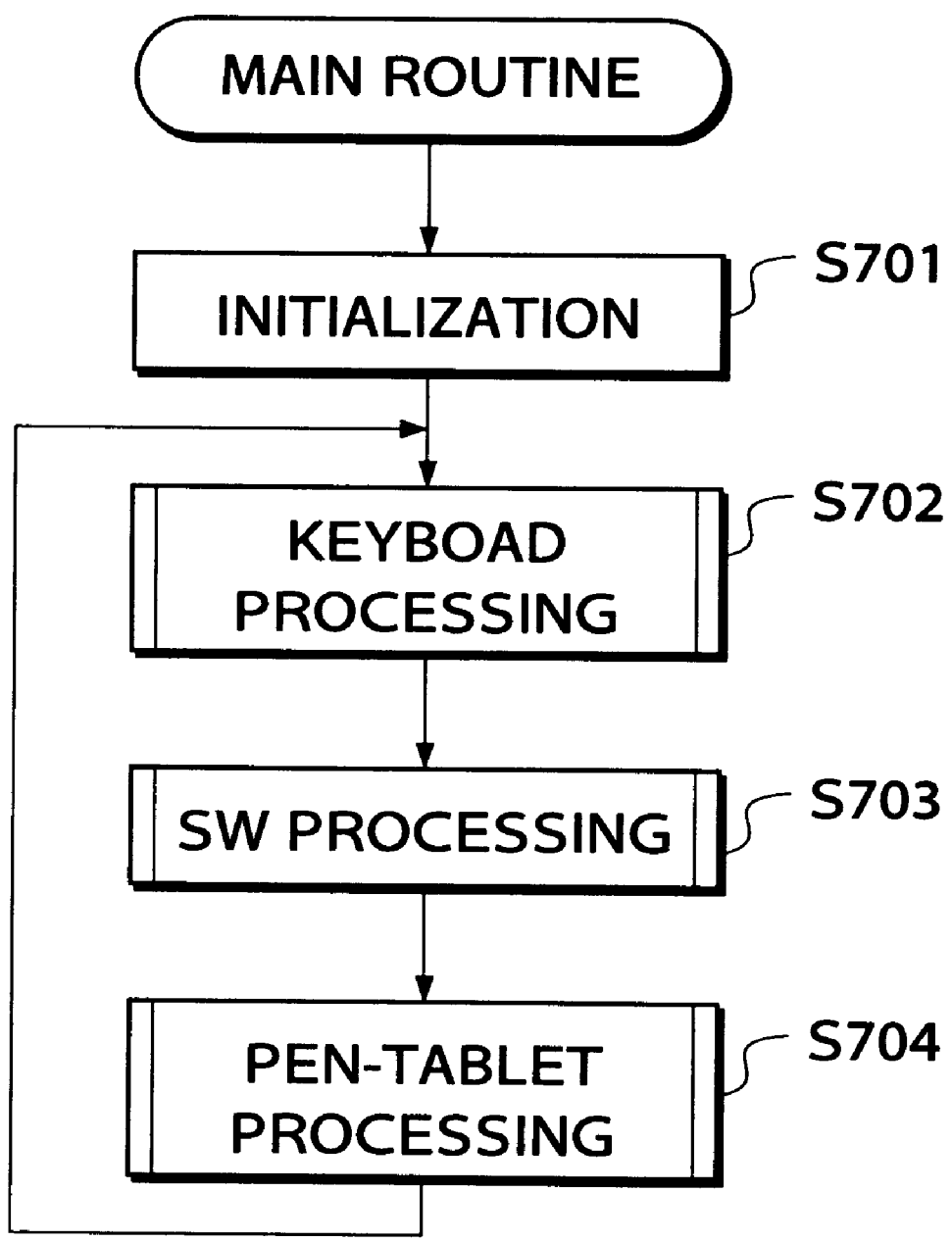
FIG. 7 is a flowchart of a main routine.

FIG. 7 is a flowchart of a main routine that is started when the power supply of the musical instrument is turned on.

Figure 15:
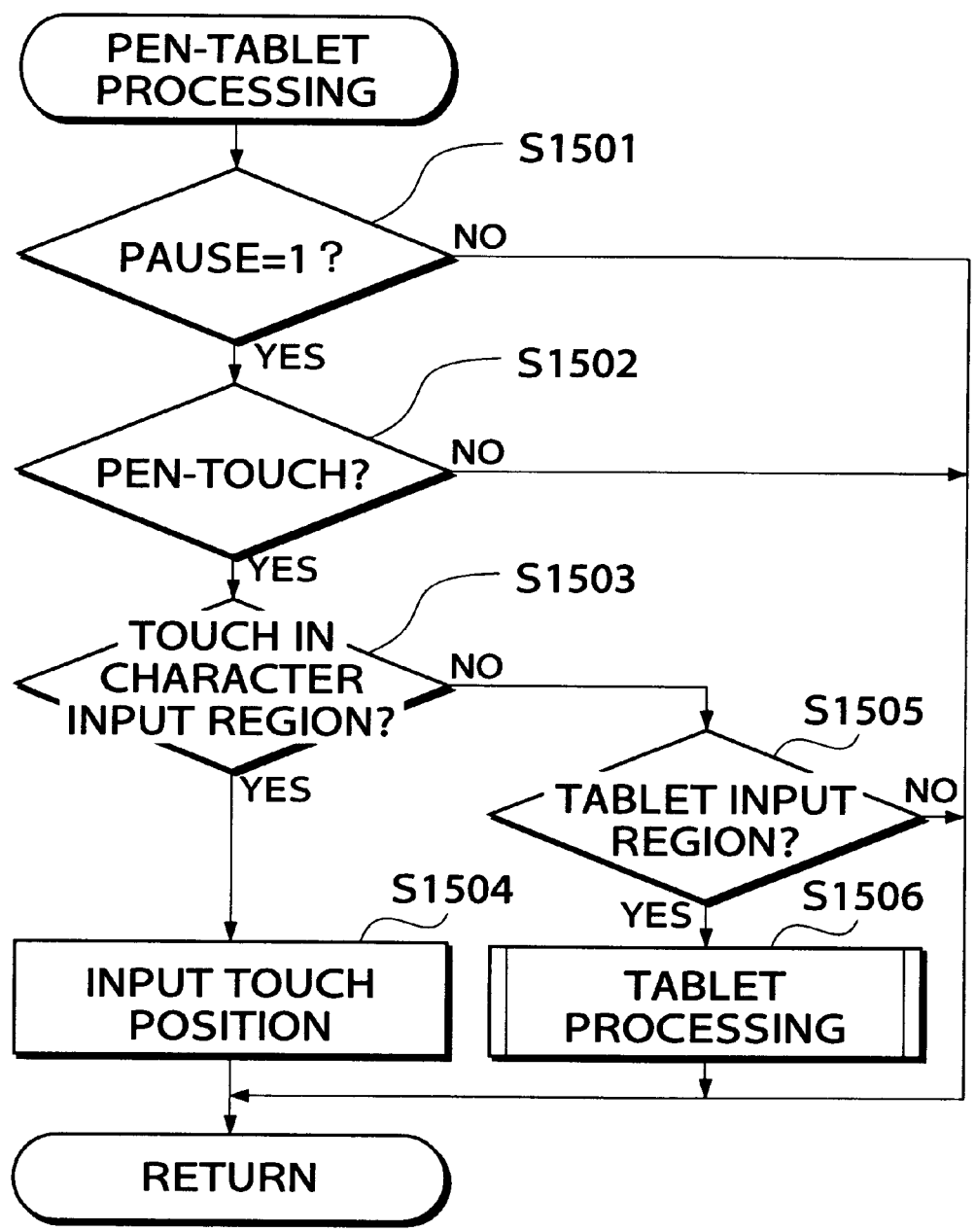
FIG. 15 is a flowchart of a pen-tablet processing routine which is executed at a step S704 in FIG. 7.

In step S701, initialization is performed, namely, various registers are initialized. For example, a flag RUN, flag PAUSE and a count value TIMING as described later are set to "0". Subsequently, a keyboard processing subroutine (step S702) as shown in FIG. 8, a switch (SW) processing subroutine (step S703) as shown in FIG. 9, and a pen tablet processing subroutine (step S704) as shown in FIG. 15 are successively performed, and the control flow returns to step S702.

Figure 8:
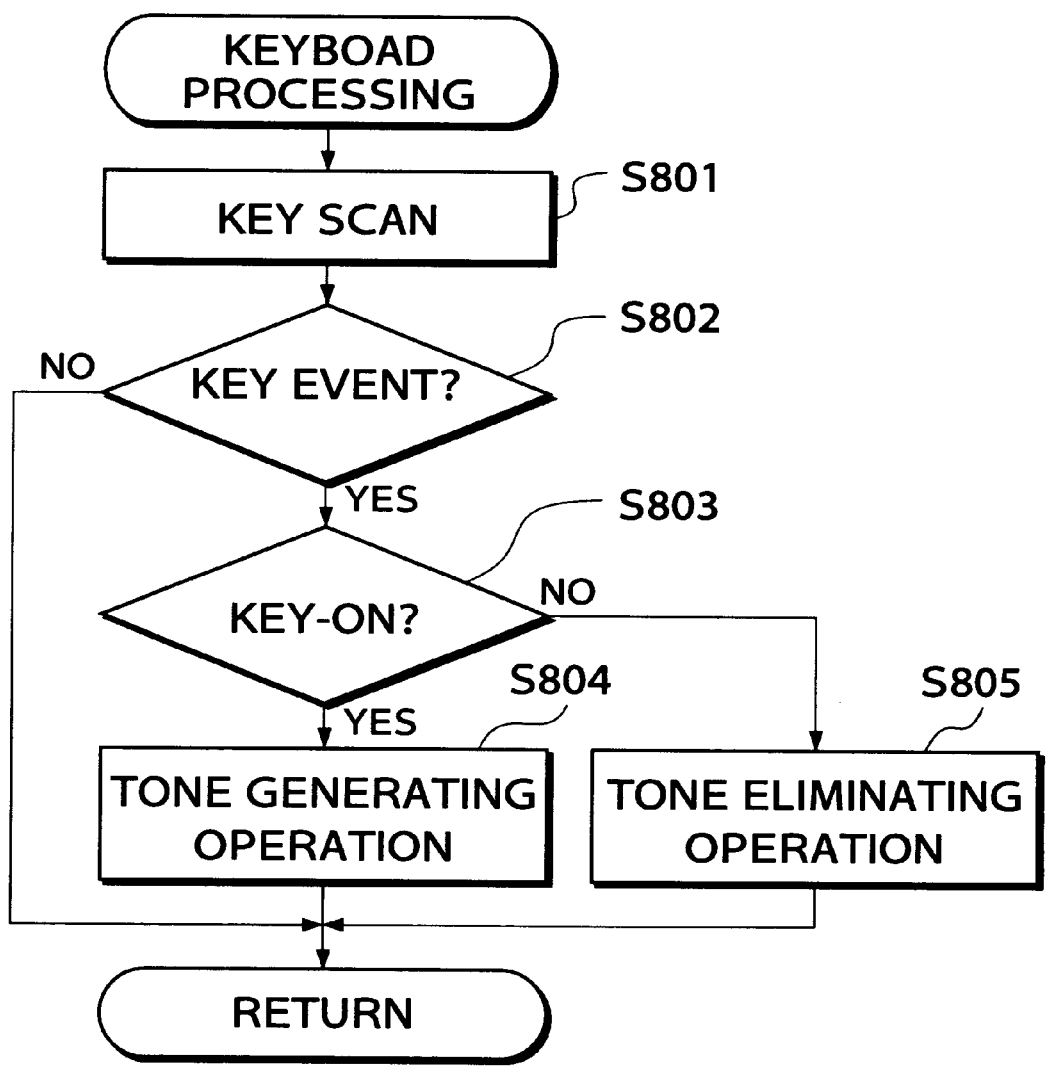
FIG. 8 is a flowchart of a keyboard processing subroutine.
Figure 9:
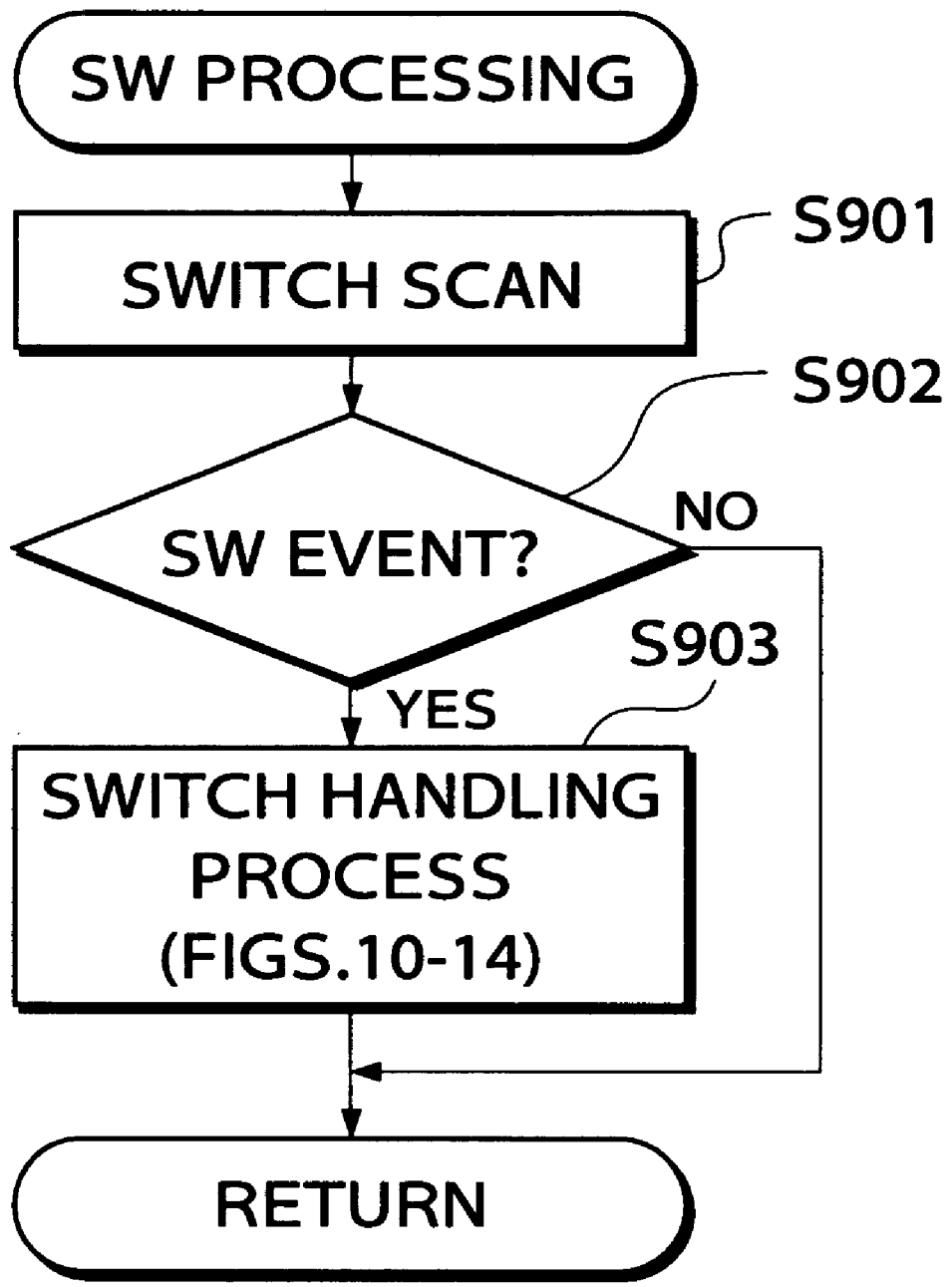
FIG. 9 is a flowchart of a switch processing subroutine.

FIG. 8 is a flowchart of the keyboard processing subroutine executed in step S702 of FIG. 7.

Initially, the key-depression detecting circuit 3 performs a key scanning operation in step S801, so as to determine whether any key event (key-on or key-off) has occurred on the keyboard 1 in step S802. If step S802 determines that no key event is present, the present subroutine is immediately terminated. If step S802 determines that a key event is present, step S803 is then executed to determine whether the key event is a key-on event or not, namely, whether any key on the keyboard 1 has been depressed.

If step S803 determines that the key event is a key-on event, a tone generating operation is performed in step S804. More specifically, pitch data corresponding to the key that has been depressed, and a key-on signal are supplied to a free tone generation channel of the tone generator circuit 15, so as to generate a musical tone signal. As a result, a musical tone is generated from the sound system 17. If step S803 determines that the key event detected in step S802 is not a key-on event but a key-off event, a tone eliminating operation is performed in step S805. More specifically, a key-off signal is supplied to the tone generation channel that is generating the musical tone signal corresponding to the key that has been released, so as to attenuate and cancel the tone signal. After performing the tone generating operation and tone eliminating operation, the present subroutine is terminated.

With the keyboard processing routine as described above, musical tones that are manually entered by the user can be generated in accordance with key operations on the keyboard 1. For example, the user is able to actually play the keyboard 1 in accordance with an automatic performance, while looking at a score displayed on the display device 19.

FIG. 9 is a flowchart of the switch (SW) processing subroutine executed in step S703 of the main routine of FIG. 7.

Initially, step S901 is executed to cause the switch detecting circuit 4 to perform a switch scanning operation, to determine in step S902 whether any switch event has occurred or not, namely, any of switches provided on the musical instrument has been operated or not. Here, switch events include input operations (pressing of buttons) on the screen of the display device 19 by means of the mouse 21. If step S902 determines that no switch event is present, the present subroutine is immediately terminated. If any switch event is present, one of processes of FIG. 10 through FIG. 14 that corresponds to the detected switch event is performed in step S903, and the present subroutine is terminated.

Figure 10:
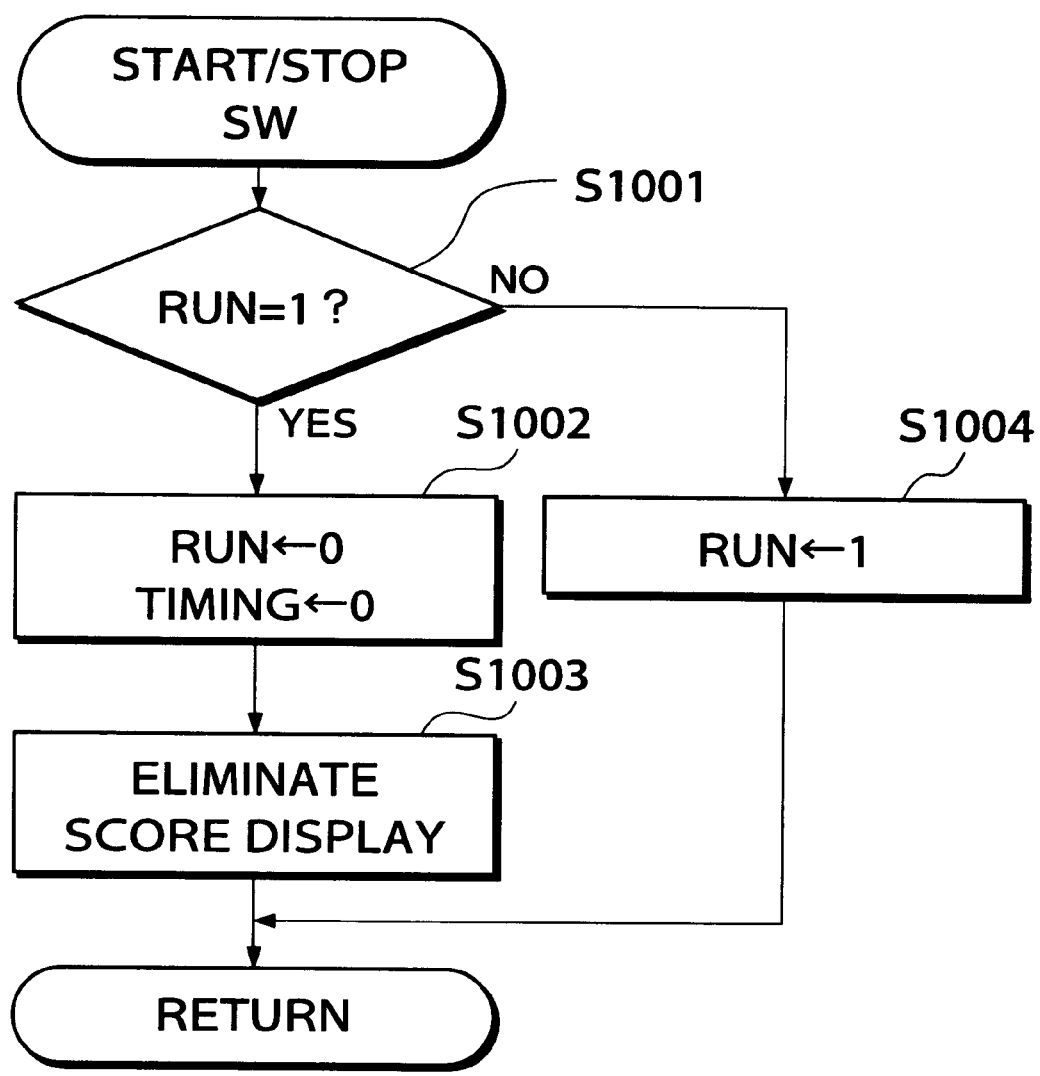
FIG. 10 is a flowchart of a start/stop SW process performed in the switch processing subroutine of FIG. 9.

FIG. 10 is a flowchart of a start/stop SW (switching) process that may be performed in step S903 of FIG. 9. This process is started when the playback/stop button 19a (FIG. 2) is pressed on the display screen of the display device 19.

Initially, step S1001 is executed to determine whether the flag RUN is set to "1" that indicates that the musical instrument is in the process of an automatic performance. If step S1001 determines that the flag RUN is set to "1", step S1002 is executed to set the fag RUN to "0", and set the count value TIMING to "0", and step S1003 is then executed to eliminate the score displayed on the display device 19. Then, the present process is terminated. If a negative answer (NO) is obtained in step S1001, namely, if the flag RUN is set to "0", step S1004 is executed to set the flag RUN to "1", and the present process is terminated.

With the process as described above, if the playback/stop button 19a (FIG. 2) is pressed while the automatic performance is going on, the automatic performance is stopped. If the playback/stop button 19a (FIG. 2) is pressed while an automatic performance is being stopped, the musical instrument starts giving an automatic performance through the above-described process.

Figure 11:
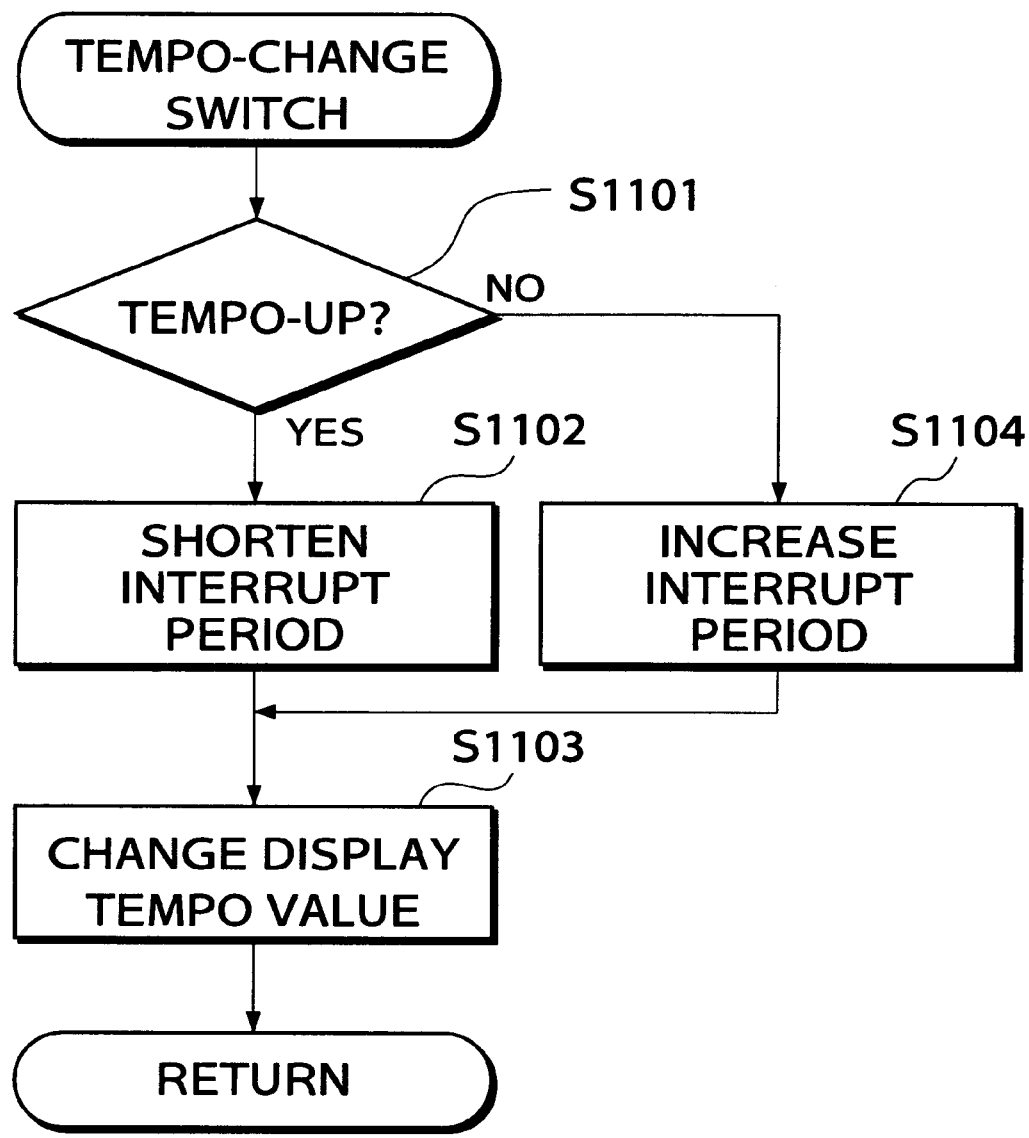
FIG. 11 is a flowchart of a tempo change SW process performed in the switch processing subroutine of FIG. 9.

FIG. 11 is a flowchart of a tempo change SW process that is performed in step S903 of FIG. 9. This process is started when either the tempo-up button 19c or tempo-down button 19d is pressed on the display screen of the display device 19. The present process serves to change the interrupt period of the timer 8 before or during an automatic performance, namely, change intervals at which an interrupt processing routine of FIG. 18 as described later is executed.

Initially, step S1101 is executed to determine whether a tempo change command generated by pressing the button 19c, 19d is a tempo-up command or not. If an affirmative answer (YES) is obtained in step S1101, namely, if the tempo-up button 19c is pressed, the interrupt period of the timer 8 is shortened in step S1102 by, for example, reducing a stored value of a register (not shown) in the timer 8, and the tempo value TM indicated on the display device 19 is changed according to the change of the interrupt period in step S1103. The present process is then terminated. If a negative answer (NO) is obtained in step S1101, namely, the tempo-down button 19d is pressed to generate a command to speed down the tempo, the interrupt period of the timer 8 is increased in step S1104 by increasing the stored value of the above-described register, and the control flow goes to step S1103.

With the process as described above, the performance tempo can be changed as desired before or during the automatic performance.

Figure 12:
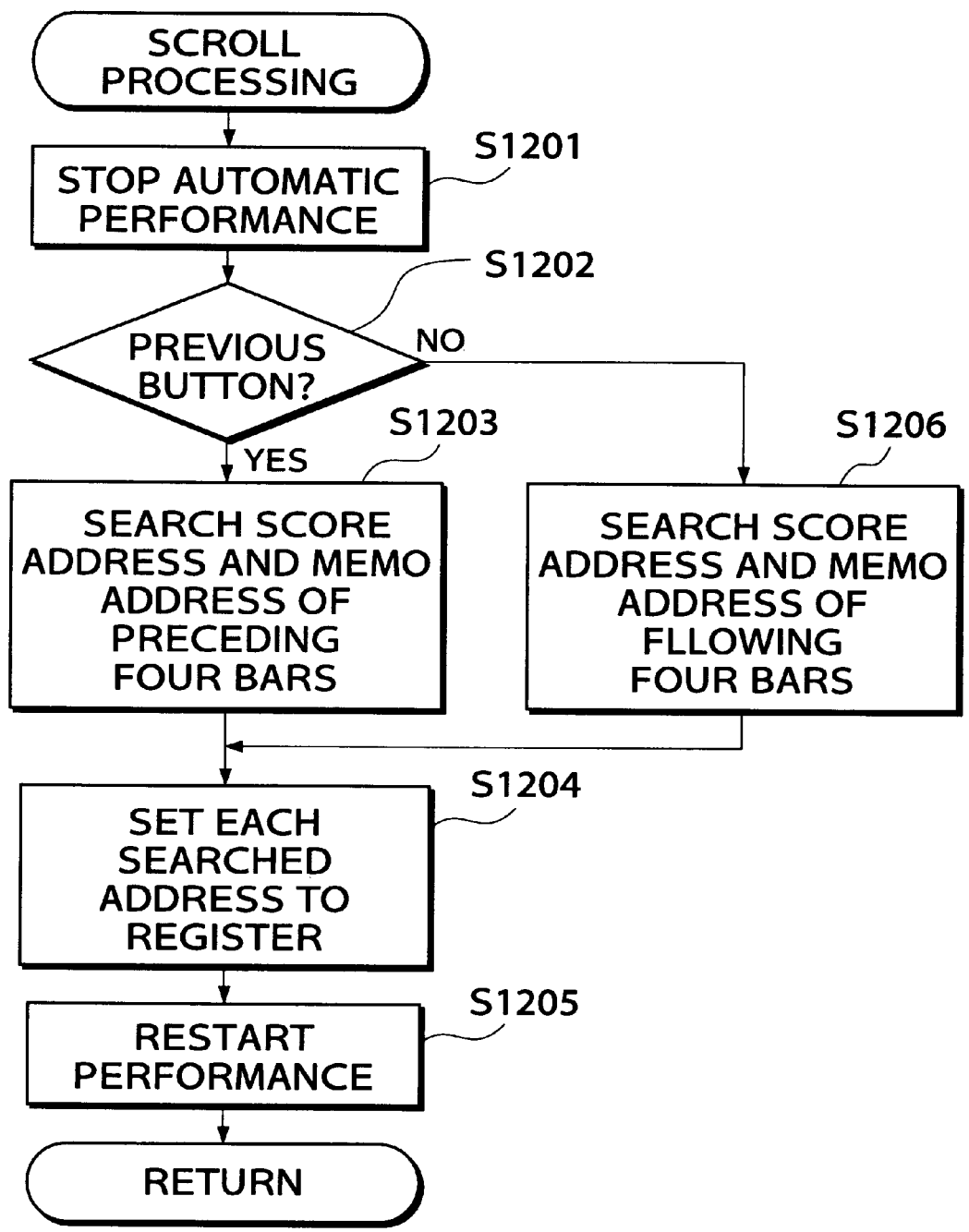
FIG. 12 is a flowchart of a scroll process performed in the switch processing subroutine of FIG. 9.

FIG. 12 is a flowchart of a scroll process that is performed in step S903 of FIG. 9. This process is started when one of the previous-page button 19e or the next-page button 19f is pressed on the display screen of the display device 19.

Initially, step S1201 is executed to stop the automatic performance, and it is determined in step S1202 whether the switch that has been pressed is the previous-page button 19e or not. If an affirmative answer (YES) is obtained in step S1202, namely, if the previous-page button 19e has been pressed, step S1203 is executed to search score address and memo address one unit of score (four bars) before the set of data for four bars that are currently played and displayed. Namely, the score address and memo address for the four bars that precede the current page (of four bars) are searched from the musical tone data MD. Then, the addresses thus searched are set in the register 7E of the RAM 7 in step S1204, so that the start position of reading out performance data is set to the head of the four bars that precede the current page, and the automatic performance data is restarted from the head position in step S1205. Then, the present process is terminated.

If a negative answer (NO) is obtained in step S1202, namely, if the next-page button 19f has been pressed, on the other hand, step S1206 is executed to search score address and memo address one unit of score (four bars) before the set of data for four bars that are currently played and displayed, from the musical tone data MD, and the start position of reading is set to the head of four bars that follow the current page (of four bars), so that the same operations as in the above steps S1204 and S1205 are performed.

With the above scroll process performed during an automatic performance, the musical instrument is able to provide a performance and display of a part of score and memos, with respect to the four bars that precede or follow the current set of four bars that are being played and displayed.

Figure 13:
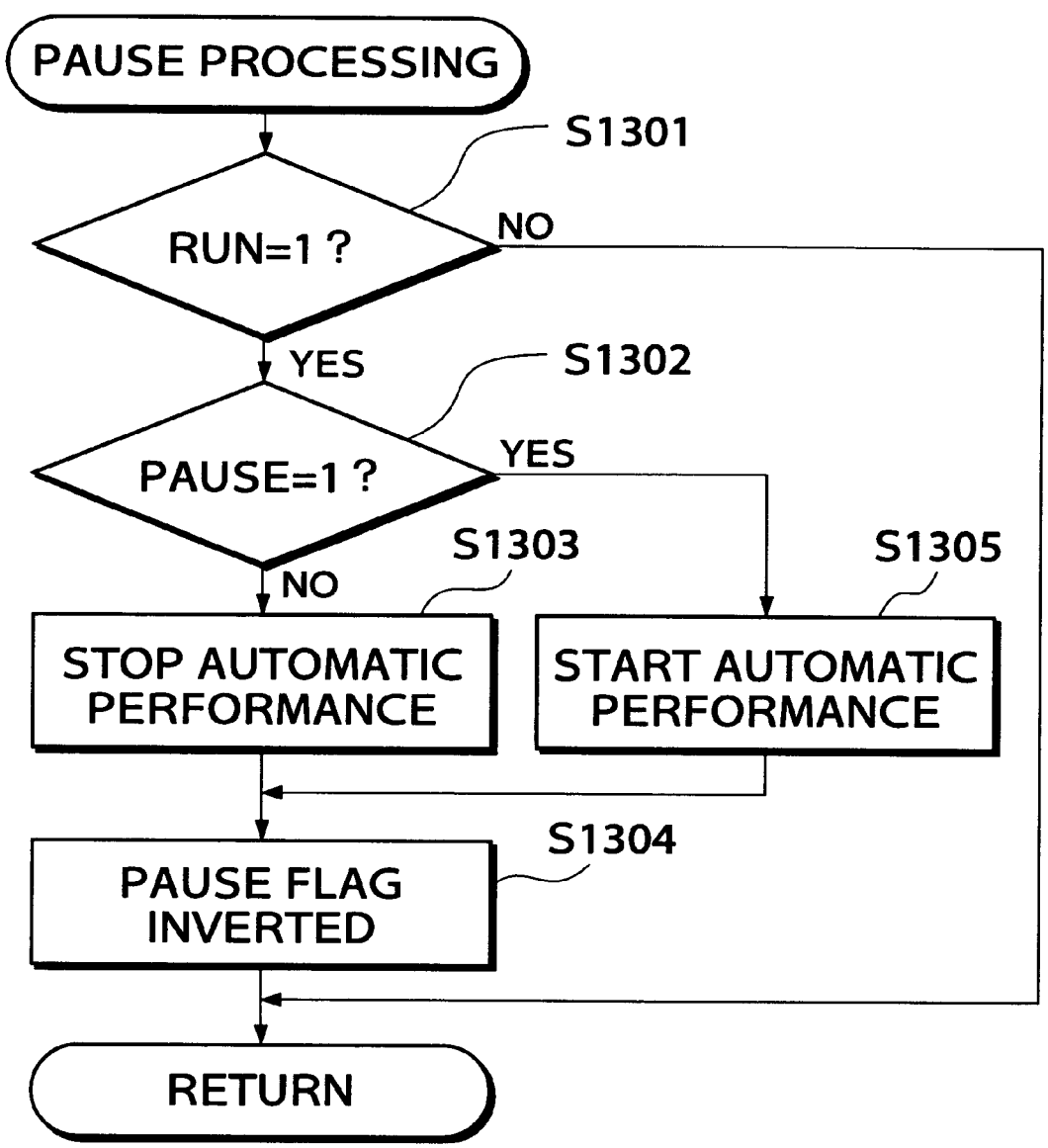
FIG. 13 is a flowchart of a pause process performed in the switch processing subroutine of FIG. 9.

FIG. 13 is a flowchart of a pause process that is performed in step S903 of FIG. 9. This process is started when the pause button 19b is pressed on the display screen of the display device 19.

Initially, step S1301 is executed to determine whether the flag RUN is set to "1" or not, namely, whether an automatic performance is going on or not. If S1301 determines that the flag RUN is not set to "1", the present process is immediately terminated. If step S1301 determines that the flag RUN is set to "1", step S1302 is executed to determine whether or not the flag PAUSE is set to "1" that indicates that the automatic performance is being paused or temporarily stopped.

If a negative answer (NO) is obtained in step S1302, namely, if the flag PAUSE is set to "0", the musical instrument is inhibited from generating musical tones to thus temporarily stop its automatic performance in step S1303, and the state of the flag PAUSE is inverted (in this case, changed from "0" to "1") in step S1304. Then, the present process is terminated. If an affirmative answer (YES) is obtained in step S1302, namely, the flag PAUSE is set to "1", on the other hand, step S1305 is executed to generate musical tones, to thus resume the automatic performance that has been temporarily stopped, namely, release the pause of the automatic performance. Step S1304 is then executed to invert the state of the flag PAUSE (from "1" to "0" in this case), and the present process is terminated.

With the above-described process, the automatic performance can be temporarily stopped or resumed as desired.

Figure 14:
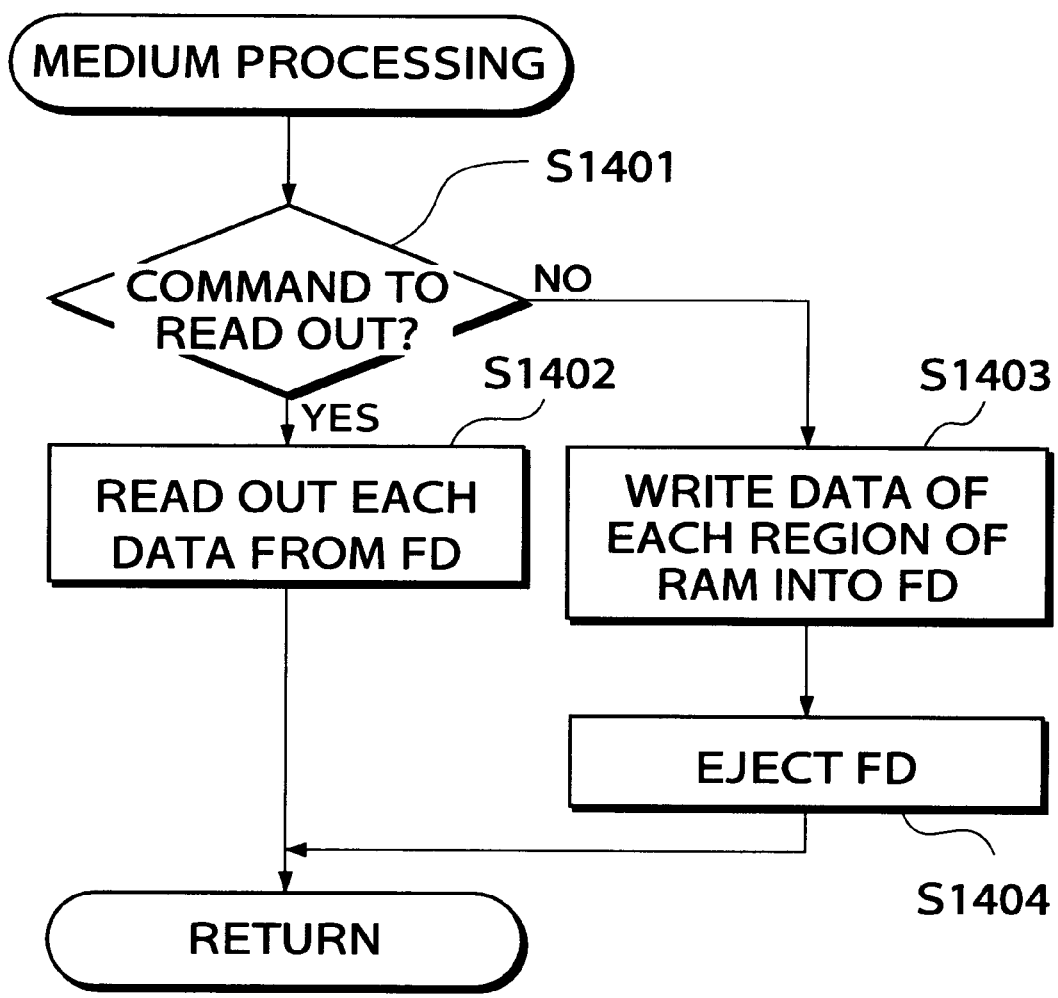
FIG. 14 is a flowchart of a medium process performed in the switch processing subroutine of FIG. 9.

FIG. 14 is a flowchart of a medium process that is performed in step S903 of FIG. 9. This process is started when a command to read out data from a medium or a command to eject the medium is entered on the initial screen (not illustrated) of the display device 19, for example.

Initially, step S1401 is executed to determine whether the command that has been entered is a command to read out data from a medium. If an affirmative answer (YES) is obtained in step S1401, namely, if a command to read out data from a medium has been entered, step S1402 is executed to read musical tone data MD, score data VD and memo data TD from a floppy disc 24 that is inserted in the floppy disc drive 10, and stored in the RAM 7, and the present process is then terminated. If a negative answer (NO) is obtained in step S1401, namely, when a command to eject the medium has been entered, data stored in the respective regions (MIDI data region 7B, score data region 7D, and memo data region 7D) within the RAM 7 are written into the floppy disc 24 in step S1403, and the floppy disc 24 is ejected from the floppy disc drive 10 in step S1404. Then, the present process is terminated.

With the process as described above, sets of data indicative of musical tones, score and memos are initially transferred from the floppy disc 24 into the RAM 7, and, after a new content is added to the memo data TD or the memo data TD is updated during an automatic performance, these sets of data can be eventually stored in the floppy disc 24. Also, the data that have been once stored in the floppy disc 24 can be read out again, thus permitting the contents of the memo data TD to be updated as many times as desired.

FIG. 15 is a flowchart of the pen tablet processing subroutine that is executed in step S704 of FIG. 7.

In the present embodiment in which characters are entered and recognized while an automatic performance is being temporarily stopped, step S1501 is initially executed to determine whether the flag PAUSE is set to "1" or not. If an affirmative answer (YES) is obtained in step S1501, namely, if the flag PAUSE is set to "1", step S1502 is then executed to determine whether pen touch is detected on the pen tablet 23 or not. If step S1502 determines that pen touch is detected on the pen tablet 23, step S1503 is executed to determine whether the position at which the pen touches the tablet 23, or touch position, is located in the character input region 23A of the pen tablet 23 or not.

If an affirmative answer (YES) is obtained in step S1503, namely, if the touch position is located in the character input region 23A of the pen tablet 23, step S1504 is executed to input the touch position, and the present subroutine is terminated. To input the touch position, the coordinates of the touch position as counted from, for example, the top (left, upper end) of the character input region 23A are stored in a buffer, not illustrated, within the image processing region 7A of the RAM 7. In this manner, the track of pen touch is stored while the above steps S1501 to S1504 are repeatedly executed.

If step S1501 determines that the flag PAUSE is set to "0", or step S1502 determines that no pen touch is detected on the pen tablet 23, the present subroutine is immediately terminated.

If a negative answer (NO) is obtained in step S1503, namely, if the touch position is not located in the character input region 23A of the pen tablet 23, step S1505 is executed to determine whether the touch position is located in the tablet input region 23B or not. If step S1505 determines that the touch position is not located in the tablet input region 23B, the present subroutine is immediately terminated. If step S1505 determines that the touch position is located in the tablet input region 23B, step S1506 is executed to perform a tablet handling process of FIG. 16, described later, and then the present subroutine is terminated.

Figure 16:
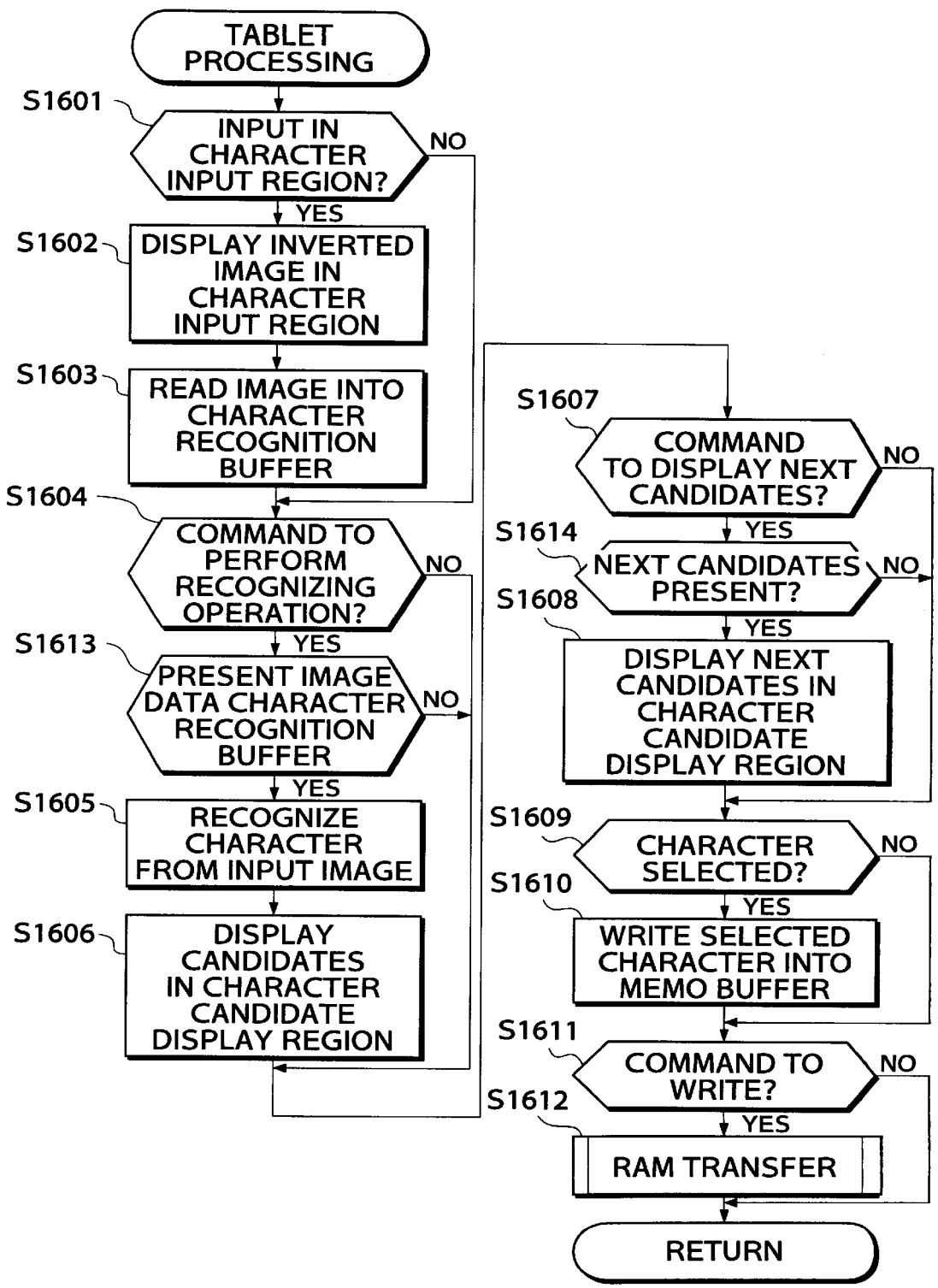
FIG. 16 is a flowchart of a tablet handling process performed in the pen-tablet processing routine of FIG. 15.

FIG. 16 is a flowchart of the tablet handling process that is performed in step S1506 of FIG. 15.

Initially, step S1601 is executed to determine whether any input has been made in the character input region 23A of the pen tablet 23 (namely, if any track of pen touch is present in the input region 23A). If step S1601 determines that some input has been made in the character input region 23A, an image corresponding to the input is displayed in high-lighted fashion (the track of pen touch is displayed) in the character input region 23A, and the image is read into the character recognition buffer 7A' of the RAM 7 in step S1603. If step S1601 determines that no input is present in the character input region 23A, or after step S1603 is executed, the control flow goes to step S1604.

In step S1604, it is determined whether the recognition button 23a in the tablet input region 23B of the pen tablet 23 has been touched to generate a command to perform a recognizing operation. If an affirmative answer (YES) is obtained in step S1604, namely, a command to perform a recognizing operation has been generated, step S1613 is executed to determine whether any image data is present in the character recognition buffer 7A' or not. If step S1613 determines that image data is present in the character recognition buffer 7A', step S1605 is executed to recognize a character from the image entered into the character input region 23A, and step S1606 is executed to display a set of character candidates in the character candidate display region 23b of the tablet input region 23. If step S1604 determines that no command to perform a recognizing operation is generated, or if step S1613 determines that no image data is present in the character recognition buffer 7A', or after step S1606 is executed, the control flow goes to step S1607.

In step S1607, it is determined whether the next candidate display button 23c in the tablet input region 23B of the pen tablet 23 has been touched to generate a command to display the next set of character candidates. If step S1607 determines that the command to display the next set of candidates is generated, step S1614 is executed to determine whether any other candidate is present or not. If an affirmative answer (YES) is obtained in step S1614, namely, if there is one or more candidate(s) that have not yet been presented, step S1608 is then executed to display the next set of character candidate(s) in the character candidate display region 23b, and the control flow goes to step S1609. If step S1607 determines that no command to display the next set of candidates is not generated, or if step S1614 determines that there is no other candidate corresponding to the image, the control flow goes directly to step S1609.

In step S1609, it is determined whether any part of the character candidate display region 23b of the tablet input region 23B of the pen tablet 23 has been touched for the purpose of selecting a character from the character candidates that are being displayed. If an affirmative answer (YES) is obtained in step S1609, namely, if any one of the candidates is selected, step S1610 is executed to write the selected character into the memo buffer 7F of the RAM 7. In this manner, the character is stored as text data. By repeating this process, a plurality of characters are written into the memo buffer 7F of the RAM 7, to provide memo data TD that will be displayed in the display region 19B of the display device 19.

When the memo data TD is written into the memo buffer 7F that is in the initial condition with no memory data TD stored therein, the display position of the currently written memo data TD on the display device 19 may be designated by means of the switch panel 2, mouse 21, or the like. If memo data TD has already been stored in the memo buffer 7F, the currently written memo data may be written over a part of the original data, or the original data may be totally replaced by the currently written data.

If step S1609 determines that no touch is detected in the character candidate display region 23b, namely, no character selection takes place, or after the above step S1610 is executed, the control flow goes to step S1611.

In step S1611, it is determined whether the pen 23e has touched the writing button 23d on the tablet input region 23B of the pen tablet 23 so as to generate a command to write data. If the command to write data is generated, step S1612 is executed to perform a RAM transfer process of FIG. 17, described later, and the present process is terminated. If no command to write data is generated, on the other hand, the present process is immediately terminated.

Figure 17:
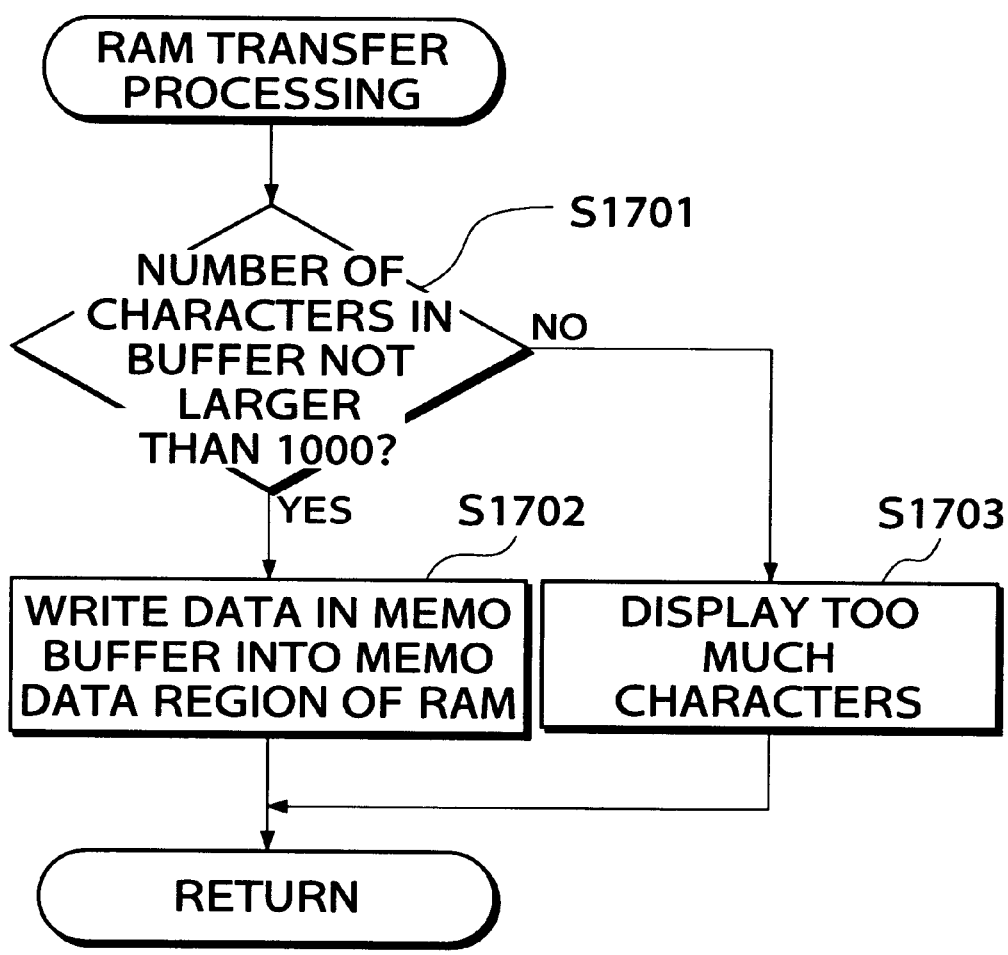
FIG. 17 is a flowchart of a RAM transfer process performed in the tablet handling process of FIG. 16.

FIG. 17 is a flowchart of the RAM transfer process that is performed in step S1612 of FIG. 16.

Initially, step S1701 is executed to determine whether the number of characters stored in the memo buffer 7F of the RAM 7 is equal to or smaller than 1000. If step S1701 determines that the number of characters is equal to or smaller than 1000, the data stored in the memo buffer 7F is transferred to or written into the memo data region 7D of the RAM 7 in step S1702, and the present process is terminated. The data of the memo buffer 7F is stored in the memo data region 7D in a manner being associated with score data VD of four bars whose score is currently displayed and at which the automatic performance is being temporarily stopped. The association of the memo data (TD) with the corresponding score data VD can be established by associating the header data H2 with the header data H3, through the score address data GA and the memo address data MA, in the manner described above. In this manner, some notes, instructions, or the like, that are desired to be left as memos with regard to the performance may be added as text data, for each set of four bars in the score data VD.

If the above-indicated step S1701 determines that the number of characters stored in the memo buffer 7F exceeds 1000, the data transferring and writing process as described above is not performed, and step S1703 is executed to display "too many characters" on the display device 19, and the present process is terminated.

With the above-described processes of FIG. 15 through FIG. 17, the user is able to enter information or characters through the pen tablet 23, as if he/she wrote memos on the score, so that the information can be stored in association with the score that is displayed in accordance with the automatic performance, and displayed in the display region 19B of the display device 19. Since the characters thus entered are stored in the form of text data in association with the score data VD, the relationship between the memo data TD and the score data VD is surely maintained even if data is repeatedly transferred between the RAM 7 and the floppy disc 24. Further, where data once stored in the floppy disc 14 contains any memo data TD, the data may be read out again, and the memo data TD may be updated by performing the processes of FIG. 15 through FIG. 17.

Figure 18:
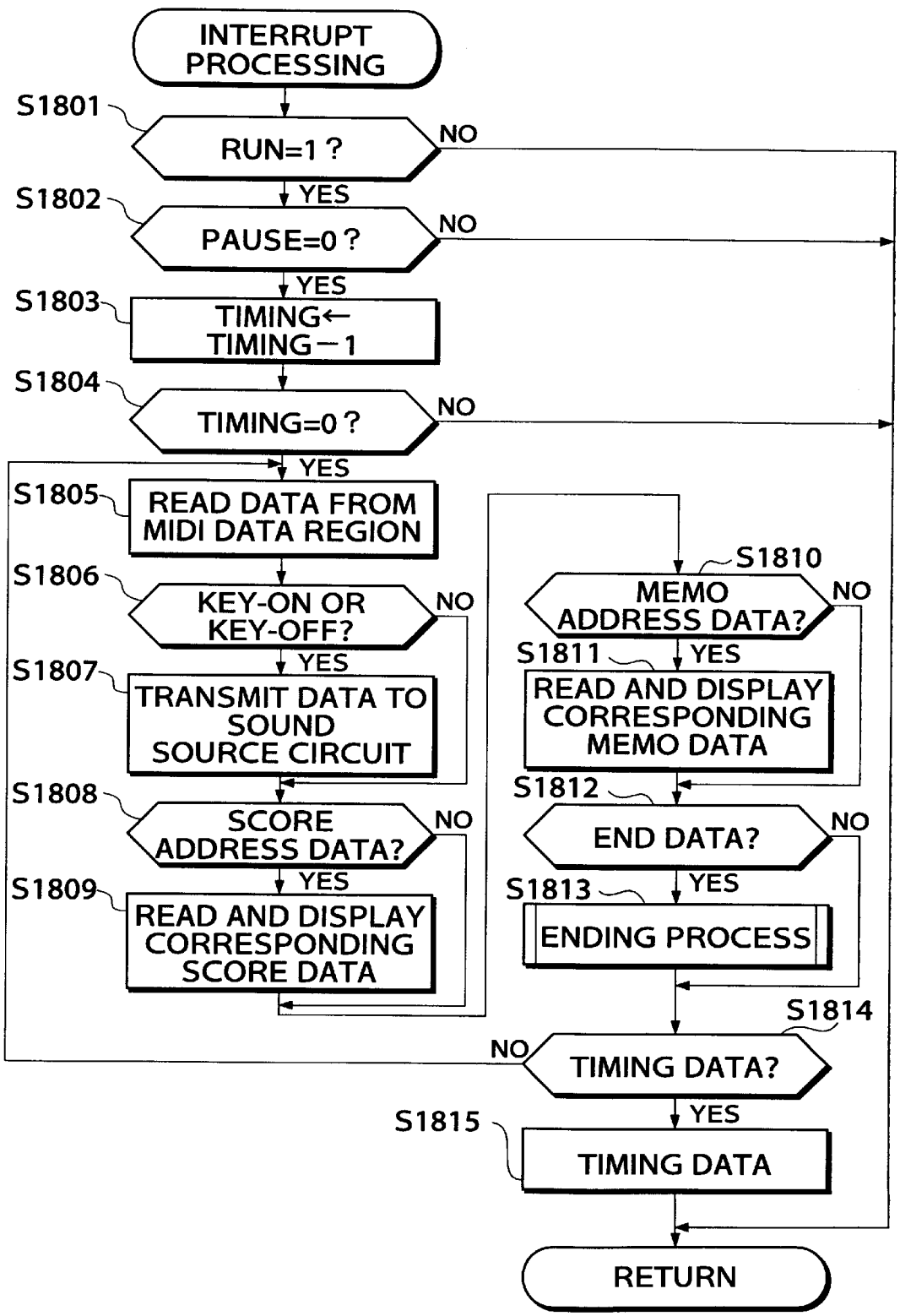
FIG. 18 is a flowchart of an interrupt processing routine.

FIG. 18 is a flowchart of the interrupt processing routine. This routine is started in response to timer interrupting that occurs, for example, 480 times within a time interval of a quarter note. Accordingly, the interval of occurrence of the time interrupting, or the interval of execution of this routine, varies in accordance with the tempo value TM that is currently set.

Step S1801 is initially executed to determine whether the flag RUN is set to "1" or not. If this step determines that the flag RUN is set to "1" (if an automatic performance is going on), step S1802 is executed to determine whether the flag PAUSE is set to "0" or not. If step S1801 determines that the flag RUN is not set to "1", or if step S1802 determines that the flag PAUSE is not set to "0", the present routine is immediately terminated.

If step S1802 determines that the flag PAUSE is set to "0", on the other hand, namely, if the automatic performance is going on, and not being temporarily stopped, step S1803 is executed to decrement the count value TIMING that is set in step S1815, by only "1", and step S1804 is executed to determine whether the count value TIMING has reached "0". If step S1804 determines that the count value TIMING has not reached "0", the present process is immediately terminated. If the count value TIMING has reached "0", on the other hand, step S1805 is executed to read out a piece of next musical tone data MD from the MIDI data region 7B of the RAM 7, and step S1806 is then executed to determine whether the musical tone data MD that has been just read is one of key-on data and key-off data.

If step S1806 determines that the musical tone data MD read in step S1805 is key-on data or key-off data, step S1807 is executed to send the data to the tone generator circuit 15 so as to generate or mute a musical tone, and the control flow goes to step S1808. If step S1806 determines that the musical tone data MD is neither key-on data nor key-off data, the control flow skips step S1807 and goes to step S1808.

In step S1808, it is determined whether the musical tone data MD read in step S1805 is score address data GA or not. If step S1808 determines that the musical tone data MD is score address data GA, step S1809 is executed in which score data VD that corresponds to the score address data GA is read out from the score data region 7C of the RAM 7, and transmitted to the display control circuit 9, so that the score data VD is displayed on the display device 19. The control flow then goes to step S1810. If step S1808 determines that the musical tone data MD is not score address data GA, the control flow goes directly to step S1810, skipping step S1809.

In step S1810, it is determined whether the musical tone data MD read in step S1805 is memo address data MA or not. If step S1810 determines that the musical tone data MD is memo address data MA, step S1811 is executed in which memo data TD that corresponds to the memo address data MA is read from the memo data region 7D of the RAM 7, and transmitted to the display control circuit 9, so that the memo data TD is displayed in the display region 19B of the display device 19. As a result, the contents of the memo are displayed along with the score corresponding to the memo. Then, the control flow then goes to step S1812. If step S1810 determines that the musical tone data MD read in step S1805 is not memo address data MA, the control flow goes directly to step S1812, skipping step S1811.

In step S1812, it is determined whether the musical tone data MD read in step S1805 is end data or not. If step S1812 determines that the musical tone data MD is end data, an ending routine of FIG. 19, described later, is performed in step S1813, and the control flow goes to step S1814. If the musical tone data MD is not end data, the control flow goes to step S1814, skipping step S1813.

In step S1814, it is determined whether the musical tone data MD read in step S1805 is timing data or not. If step S1814 determines that the musical tone data MD is timing data, step S1815 is executed to set its data value to the count value TIMING, and the present routine is terminated. If the musical tone data MD is not timing data, the control flow returns to step S1805.

Figure 19:
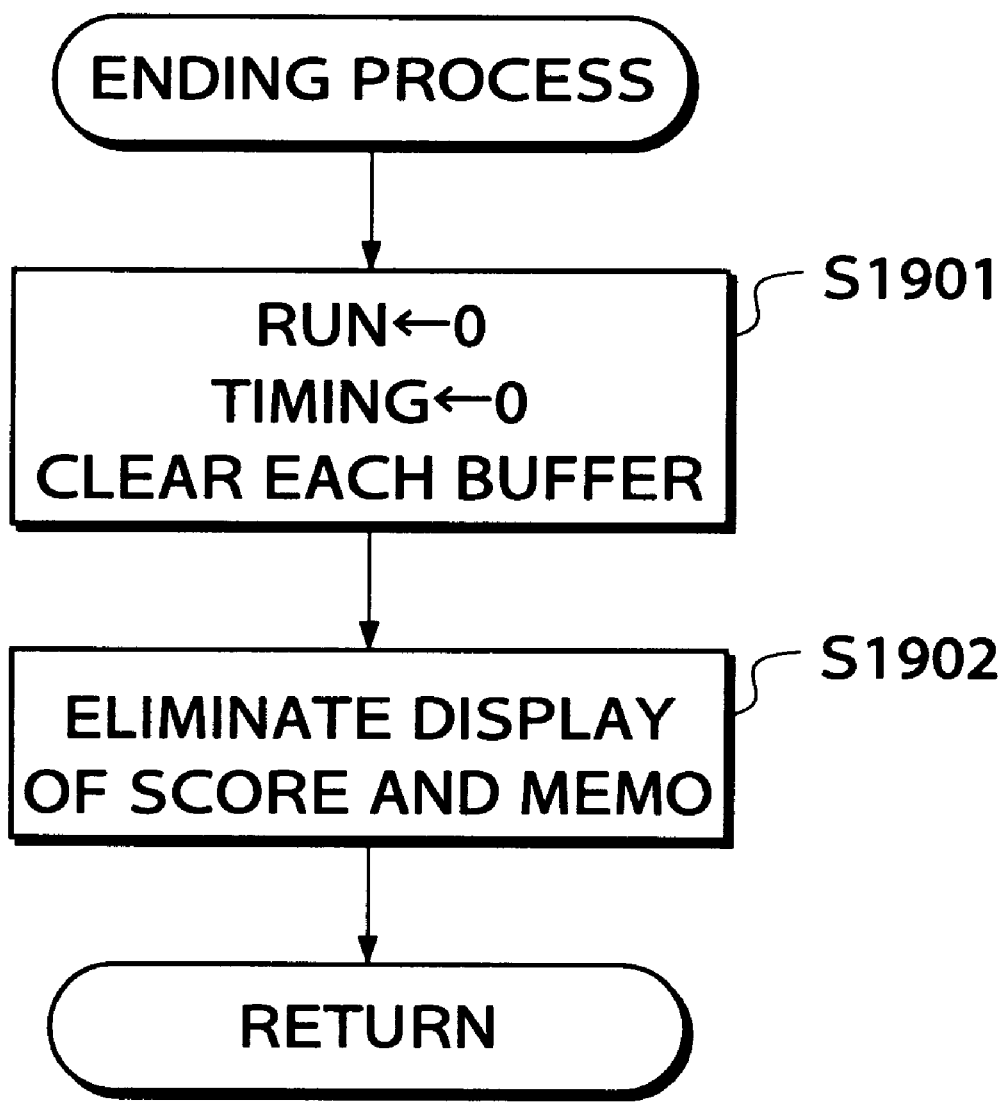
FIG. 19 is a flowchart of an ending process performed in the interrupt processing routine of FIG. 18.

FIG. 19 is a flowchart showing the ending routine that is executed in step S1813 of FIG. 18.

Initially, step S1901 is executed to reset the flag RUN and the flag PAUSE to "0", and clear each of the above-described buffers, including the memo buffer 7F of the RAM 7. Step S1902 is then executed to eliminate display contents, such as a part of score and memos, that are present on the display device 19, and the present routine is then terminated.

With the above-described routines of FIG. 18 and FIG. 19, control of musical tones, namely, generation/elimination of musical tones, is performed according to the score data VD read from the RAM 7, and at the same time the contents of memo data TD added to the score data VD are displayed along with the score, in accordance with the automatic performance.

In the present embodiment in which an automatic performance and score display are provided based on input automatic performance data, memo data TD can be added to each set of score data VD corresponding to four bars, and displayed at the same time that the score is displayed. Accordingly, memos, such as points to be noted during a performance, guidance or instructions of a teacher, or notes, can be displayed for each set of four bars of the score. Furthermore, the memo data TD added to the score data VD may be stored in the floppy disc 24, and can be read out and used again, which is particularly advantageous when the piece of music is played a plurality of times for practice. Also, the pen tablet 23 allows memo data TD to be entered as if memos were written on paper, thus assuring improved handling ease. Specifically, the musical instrument of the present embodiment is particularly useful as learning equipment.

In the illustrated embodiment, a piece of music is automatically played with its score being displayed, based on automatic performance data. The present invention, however, is not limited to this type of apparatus, but may be applied to such an apparatus that only displays a score, without being accompanied by performance data. In this case, data to be handled may be constructed as shown in FIGS. 20A and 20B, instead of the data as shown in FIGS. 5A–5C, and the interrupt processing routine may be performed according to a flowchart shown in FIG. 21, instead of that as shown in FIG. 18.

Figure 21:
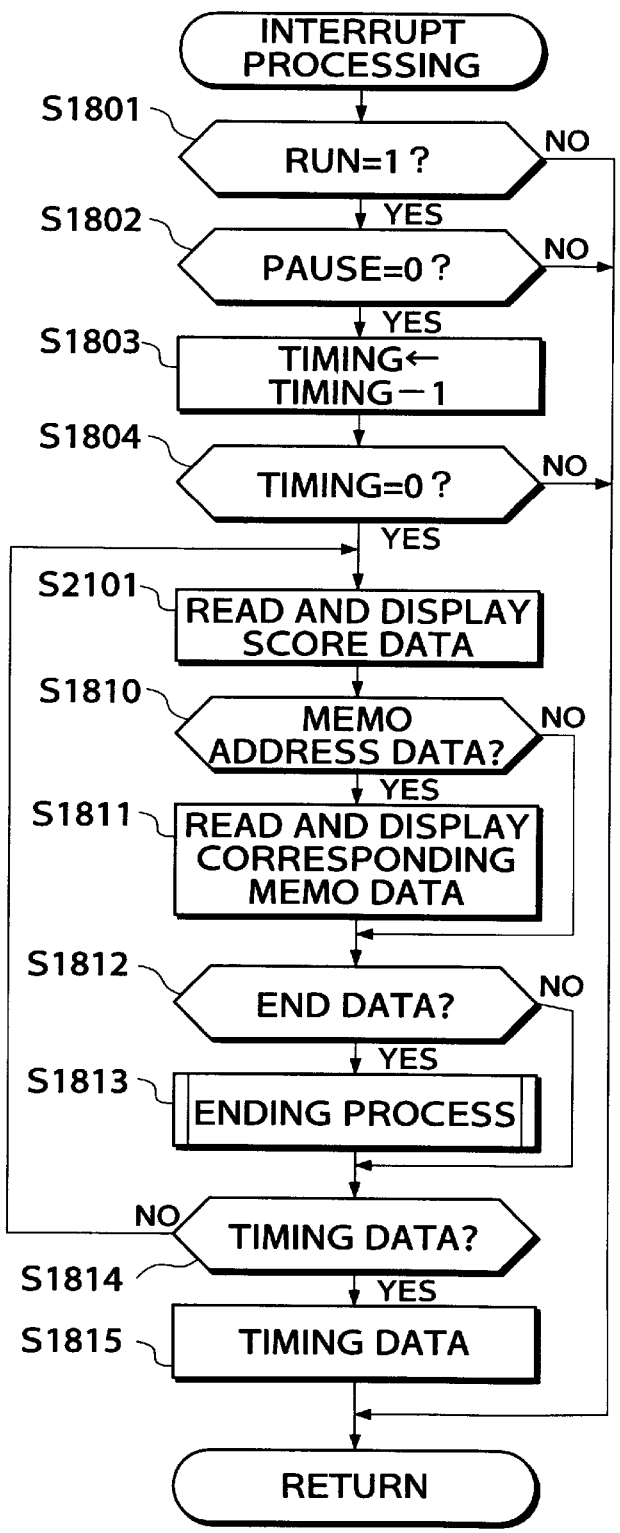
FIG. 21 is a view showing another example of flowchart of an interrupt processing routine.

More specifically, the data to be handled by the above apparatus do not include musical tone data MD, but include score data VD' consisting of header data H1', timing data and memo addresses, and memo data TD' similar to that as shown in FIG. 5C. In the interrupt processing, steps S1805 through S1809 of FIG. 18 are replaced by step S2101 as shown in FIG. 21, for reading and displaying score data. The other steps are performed in the same manner as in FIG. 18.

With this arrangement, the same effects as provided in the illustrated embodiment can be obtained with respect to score display and memo display, except for those relating to automatic performance.

It is to be understood that the object of the present invention may also be accomplished by supplying a system or an apparatus with a storage medium in which a software program having the functions of the above-described embodiment is recorded, and causing a computer (CPU 5 or MPU) of the system or apparatus to read out and execute the program stored in the storage medium.

In this case, the program itself read out from the storage medium accomplishes the novel functions of the present invention, and thus the storage medium storing the program constitutes the present invention.

The storage medium for supplying the above-described program to the system or apparatus may be in the form of a portable storage medium, such as a hard disc mounted in the HDD 11, a disc inserted in the CD-ROM drive 12, MO, MD, floppy disc 24, CD-R (CD-Recordable), magnetic tape, nonvolatile memory card, and ROM, for example. The program may be directly transferred from such a portable storage medium to the RAM 7, as in the present embodiment, or may be transferred from the storage medium to the hard disc within the HDD 11. Also, the program may be supplied from other MIDI equipment 100, or the server computer 102 via the communication network 101.

The functions of the illustrated embodiment may be performed not only by executing the program read by the computer, but also by causing OS operating on the computer to perform a part or all of actual operations according to commands of the program.

Furthermore, the program read out from the storage medium may be written into an expanded board inserted in the computer, or a memory included in an expanded unit connected to the computer, and then CPU 5, or the like, provided in the expanded board or expanded unit may actually perform part of or all of the operations according to the commands of the program, so as to accomplish the functions of the illustrated embodiment.

While the additional data takes the form of text data that represent memos written on the pen tablet 23 in the illustrated embodiment, the present invention is not limited to the use of this type of additional data. For example, memos written on the pen tablet 23 may be displayed and stored as they remain as image data. Also, the additional data may be voice data of special sound. In this case, a storage region for the voice data may be provided in the RAM 7, and voice, instead of display, may be generated. The voice data may be instructions of a music teacher. As means for entering such voice data as additional data, a microphone may be used. In this case, the voice of a music teacher, or others, may be entered via the microphone, so that the voice data that contain instructions of the teacher or others is stored as additional data, and the voice of the music teacher or others may be reproduced while the score data is displayed.

Where the user plays a piece of music in accordance with an automatic performance, for example, and data of the self or manual performance are to be displayed in the form of a score and stored in a manner being associated with automatic performance data, the additional data may be the self performance data. In this case, a storage region for the self performance data is provided in the RAM 7, and the self performance data stored in this region may be automatically played alone or along with the original automatic performance data, so that the self performance and the automatic performance can be compared with each other. Further, the self performance data may be processed into a score to be displayed.

While the unit of score to which the memo data TD is added consists of four bars in the illustrated embodiment, the present invention is not limited to this arrangement, but the unit may be set to various values. Also, the unit of score to be displayed at a time does not necessarily coincide with the unit of score to which the memo data TD is added.

While the memo data TD is entered by means of the pen tablet 23 in the illustrated embodiment, the present invention is not limited to this arrangement. Where the display device 19 is constructed so as to permit direct entry of information into the display screen by means of a touch sensor, for example, the memo data TD may be directly entered and displayed.

While the illustrated embodiment is constructed as an electronic instrument that incorporates a score display apparatus, the present invention may be otherwise embodied. For example, the present invention may be embodied as a commercially available personal computer in which a software program and various related information for realizing the present invention are installed. As another embodiment of the invention, there may be provided a dedicated device which incorporates the pen tablet 23, display device 19 and others. In these cases, too, the above program and various related information that constitute the invention may be distributed by storing them in portable storage media as described above, or storing them in nonvolatile memories, such as ROM 6, provided in commercially available personal computers, or may be distributed via the communication interface 14.

As another modified example of the illustrated embodiment, external switches having substantially the same functions as the respective menu buttons on the display device 19 as shown in FIG. 2 may be provided on the switch panel 2, to enable such operations as scrolling. The apparatus may also be provided with an additional function, such as a function of displaying a cursor at a location of a score where a musical tone is generated during an automatic performance, or a function of automatically turning pages of a score. It is also possible to prevent the memo data TD from being displayed by an unknown user, by adding identification information to the memo data TD to be stored.

What is claimed is:

1. A score display apparatus comprising:
an input device that inputs score display data;
an adding device that adds additional data to the score display data input by said input device in a manner that the additional data correspond to at least one predetermined portion of a score based on the score display data input by said input device, said additional data being input by a user;
a storage device that stores the score display data and the additional data;
a display device that displays the score based on the score display data input by said input device, and also displays the additional data such that the additional data is associated with the at least one predetermined portion of the score based on the score display data; and a storing device that stores the score display data and the additional data in said storage device while associating the score display data and the additional data with each other.

2. A score display apparatus as defined in claim 1, wherein said input device inputs the score display data and the additional data that are stored in said storage device by the storing device, and wherein said adding device includes an updating device capable of updating the additional data added to the score display data.

3. A score display apparatus as defined in claim 1, wherein said additional data comprises at least one of text data, image data, voice data, and performance data.

4. A score display apparatus as defined in claim 1, further comprising a character recognition device that recognizes a character written by a user, and produces text data corresponding to the recognized character, wherein said additional data comprises the text data produced by said character recognition device.

5. A score display apparatus according to claim 4, wherein said character recognition device presents at least one candidate of the recognized character to the user, and produces text data corresponding to one of said at least one candidate that is selected by the user.

6. A method of displaying a score, comprising the steps of:

inputting score display data;

adding additional data to the input score display data in a manner that the additional data correspond to at least one predetermined portion of the score display data, said additional data being input by a user;

displaying the input score display data on a display device, and also displaying the additional data such that the additional data is associated with the at least one predetermined portion of the score display data displayed on the display device; and storing the score display data and the additional data in a storage device while associating the score display data and the additional data with each other.

7. A method as defined in claim 6, wherein the score display data and additional data stored in said storage device are input as the score display data, and wherein the input additional data is allowed to be updated.

8. A method as defined in claim 6, wherein said additional data comprises at least one of text data, image data, voice data, and performance data.

9. A method as defined in claim 6, further comprising the step of recognizing a character that is written by a user, and producing text data corresponding to the recognized character, said additional data comprising the text data thus produced.

10. A method as defined in claim 9, wherein at least one candidate of the recognized character is presented to the user, and the text data is produced based on one of said at least one candidate that is selected by the user.

11. A mechanically readable storage medium storing commands that cause a machine to perform a score displaying method comprising the steps of:

inputting score display data;

adding additional data to the input score display data in a manner that the additional data correspond to at least one predetermined portion of the score display data, said additional data being input by a user;

displaying the input score display data on a display device, and also displaying the additional data such that the additional data is associated with the at least one predetermined portion of the score display data displayed on the display device; and storing the score display data and the additional data in a storage device while associating the score display data and the additional data with each other.

12. A storage medium as defined in claim 11, wherein the score display data and additional data stored in said storage device are input as the score display data, and wherein the input additional data is allowed to be updated.

13. A storage medium as defined in claim 11, wherein said additional data comprises at least one of text data, image data, voice data, and performance data.

14. A storage medium as defined in claim 11, wherein said score display method further comprises the step of recognizing a character that is written by a user, and producing text data corresponding to the recognized character, said additional data comprising the text data thus produced.

15. A storage medium as defined in claim 14, wherein at least one candidate of the recognized character is presented to the user, and the text data is produced based on one of said at least one candidate that is selected by the user.

* * * * *